United States Patent [19]

Reischl

[11] 4,310,449

[45] * Jan. 12, 1982

[54] PROCESS FOR THE PREPARATION OF STABLE DISPERSIONS

[75] Inventor: Artur Reischl, Leverkusen, Fed. Rep. of Germany

[73] Assignee: Bayer Aktiengesellschaft, Leverkusen, Fed. Rep. of Germany

[*] Notice: The portion of the term of this patent subsequent to Jan. 12, 1999, has been disclaimed.

[21] Appl. No.: 804,843

[22] Filed: Jun. 8, 1977

[30] Foreign Application Priority Data

Jun. 16, 1976 [DE] Fed. Rep. of Germany ....... 2627073

[51] Int. Cl.$^3$ .................... C08F 8/30; C08K 5/05; C08L 25/12; C08L 75/04
[52] U.S. Cl. .................... 260/29.6 NR; 260/29.2 TN; 260/33.4 UR; 521/163; 525/127; 525/131
[58] Field of Search ................ 260/29.2 TN, 29.6 NR

[56] References Cited

U.S. PATENT DOCUMENTS

| | | | |
|---|---|---|---|
| 2,993,013 | 7/1961 | Wolfe | 260/859 R |
| 3,213,049 | 10/1965 | Heiss | 260/29.2 TN |
| 3,248,259 | 4/1966 | Borsellino et al. | 260/29.2 TN |
| 3,325,421 | 6/1967 | Muller | 260/29.2 TN |
| 3,428,592 | 2/1969 | Youker | 260/29.2 TN |
| 3,436,303 | 4/1969 | Raymond et al. | 260/29.2 TN |
| 3,491,051 | 1/1970 | Elkin et al. | 260/29.2 TN |
| 3,575,894 | 4/1971 | Zorn et al. | 260/29.2 TN |
| 3,624,020 | 11/1971 | Klebert et al. | 260/29.2 TN |
| 3,646,178 | 2/1972 | Traubel et al. | 260/29.2 TN |
| 3,655,437 | 4/1972 | Becker et al. | 260/29.2 TN |
| 3,686,108 | 8/1972 | Reiff et al. | 260/29.2 TN |
| 3,868,350 | 2/1975 | Reiff et al. | 260/29.2 TN |
| 3,951,898 | 4/1976 | Paul | 260/29.2 TN |
| 3,971,745 | 7/1976 | Carlson et al. | 260/29.2 TN |
| 4,048,001 | 9/1977 | Remley | 260/29.2 TN |
| 4,093,569 | 6/1978 | Reischl et al. | 260/29.2 TN |

FOREIGN PATENT DOCUMENTS 2014385 10/1971 Fed. Rep. of Germany ..... 260/29.2 TN

*Primary Examiner*—John C. Bleutge
*Assistant Examiner*—A. H. Koeckert
*Attorney, Agent, or Firm*—Gene Harsh; Joseph C. Gil; Richard A. Elder

[57] ABSTRACT

The present invention relates to a process for the in situ preparation of stable dispersions of polyisocyanate polyaddition products in hydroxyl-containing compounds as dispersing agents, by a process which comprises reacting 1. organic polyisocyanates with
2. compounds having primary and/or secondary amino groups and/or primary hydroxyl groups and/or ammonia in
3. compounds having at least one hydroxyl group, compounds 3 having secondary hydroxyl groups if compounds 2 have primary hydroxyl groups and wherein the starting components are reacted together in the presence of more than 4% by weight of water, based on the reaction mixture including water, the process being characterized in that the polyisocyanate polyaddition reaction is carried out in the presence of a polymer latex or in the solution of an ionic, linear polyurethane. If desired, the water is subsequently removed in known manner. The invention also relates to the use of the dispersions made by this process in preparing polyurethane resins.

10 Claims, No Drawings

PROCESS FOR THE PREPARATION OF STABLE DISPERSIONS

BACKGROUND OF THE INVENTION

In copending applications Ser. Nos. 740,451 now abandoned and 740,452, now U.S. Pat. No. 4,093,569, a process is described for the preparation of low viscosity dispersions of polyisocyanate polyaddition products in polyhydroxyl compounds, in which the polyaddition products are produced in situ in the polyhyroxyl compound in the presence of a considerable quantity of water (preferably from 7 to 35% by weight, based on the total quantity of reaction mixture).

DESCRIPTION OF THE INVENTION

It has now been found that the properties of polyurethane resins produced from such dispersions can be modified in a commercially advantageous manner if, instead of using water as in the process according to the above-identified copending applications, there is used a corresponding quantity of an aqueous polymer latex, for example a dispersion of a polycondensation product or an aqueous polyurethane dispersion; or the aqueous solution of an ionic polyurethane. The polymer latex or polyurethane solution should have a solids content of from 1 to 60% by weight, preferably 5 to 55% by weight, so that the ratio by weight of solids content of the polymer latex to the polyaddition product prepared in situ is between 1:99 and 99:1, preferably between 10:90 and 90:10, most preferably between 25:75 and 75:25. Unexpectedly, the polymer latex and the polyaddition product cause a synergistic improvement of mechanical properties of polyurethane resins produced from the dispersions according to the invention.

The present invention thus relates to a process for the in situ preparation of stable dispersions of polyisocyanate polyaddition products in hydroxyl-containing compounds as dispersing agents, by a process which comprises reacting 1. organic polyisocyanates with
2. compounds having primary and/or secondary amino groups and/or primary hydroxyl groups and/or ammonia in
3. compounds having at least one hydroxyl group, compounds 3 having secondary hydroxyl groups if compounds 2 have primary hydroxyl groups and wherein the starting components are reacted together in the presence of more than 4% by weight of water, based on the reaction mixture including water, the process being characterized in that the polyisocyanate-polyaddition reaction is carried out in the presence of a polymer latex or in the solution of an ionic, linear polyurethane. If desired, the water is subsequently removed in known manner.

The invention also relates to the use of the dispersions made by this process in preparing polyurethane resins.

When choosing a suitable latex for the process according to the invention from the known aqueous latices of polymers, polycondensates, polyaddition products or mixtures thereof, it is necessary to take into account their compatibility with the dispersing agent which carries alcohol groups. Aqueous polyurethane dispersions are particularly widely applicable.

Numerous processes have become known for the preparation of polyurethane dispersions in water. A summarizing report has been given, for example, by D. Dieterich and H. Reiff in "DIE ANGEWANDTE MAKROMOLEKULARE CHEMIE" 26 1972 (pages 85–106); by D. Dieterich et al in "Angewandte Chemie", 82 1970 (pages 53–63) and by D. Dieterich et al in J. Oil Col. Chem. Assoc. 1970, 53, (363–379). These reports also give a compreshensive survey of the literature. In practice, the most popular method for preparing aqueous polyurethane dispersions comprises reacting an isocyanate prepolymer dissolved in an organic solvent with a chain lengthening agent. In this process, either the prepolymer or the chain lengthening agent contains ionic groups or groups capable of ion formation. These groups capable of ion formation are converted into ionic groups either during the polyaddition reaction or subsequently. Formation of the aqueous dispersion is carried out at the same time or subsequently by the addition of water and removal of the organic solvent by distillation.

As already mentioned above, both cationic and anionic and non-ionic polyurethane dispersions may be used in the process according to the invention. Aqueous polyurethane dispersions which give rise to polyurethane foils with elastic properties when dry are preferred for the purpose of the invention. Particularly preferred are rubbery elastic or, at least, high impact resistant polyurethanes, polyureas or polyhydrazodicarbonamides which have a ball pressure hardness below 1400 kp/cm$^2$ (60 seconds according to DIN 53 456) and preferably a Shore hardness D of less than 55 and most preferably a Shore hardness A of less than 98. Dispersions of harder polyurethanes may, of course, be used in individual cases for obtaining foams with special properties.

As already mentioned above, aqueous polyurethane dispersions suitable for the process according to the invention may be obtained quite generally by including in the preparation of the polyurethanes components which contain ionic groups or groups capable of ion formation and, in addition, at least one isocyanate group or at least one hydrogen atom which is reactive with isocyanate groups. The following are examples of compounds of this kind, which may be used in the form of mixtures:

(1) Compounds containing basic tertiary amino groups which can be neutralized with aqueous acids or quaternized:

(a) Alcohols, in particular alkoxylated aliphatic, cycloaliphatic, aromatic and heterocyclic secondary amines, e.g. N,N-dimethylethanolamine; N,N-diethylethanolamine; N,N-dibutylethanolamine; 1-dimethylaminopropanol-(2); N,N-methyl-$\beta$-hydroxyethyl aniline; N,N-methyl-$\beta$-hydroxypropylaniline; N,N-ethyl-$\beta$-hydroxyethyl aniline; N,N-butyl-$\beta$-hydroxyethyl-aniline; N-oxethylpiperidine; N-oxyethylmorpholine; $\alpha$-hydroxyethylpyridine and $\gamma$-hydroxyethylquinoline.

(b) Diols and triols, in particular alkoxylated aliphatic, cycloaliphatic, aromatic and heterocyclic primary amines, e.g. N-methyldiethanolamine; N-butyldiethanolamine; N-oleyldiethanolamine; N-cyclohexyldiethanolamine; N-methyldiisopropanolamine; N-cyclohexyl-diisopropanolamine; N,N-diethoxyaniline; N,N-diethoxy-m-toluidine; N,N-diethoxy-p-toluidine; N,N-dipropoxy-naphthylamine; N,N-tetraethoxy-$\alpha$-aminopyridine; diethoxypiperazine; polyethoxylated butyldiethanolamine; polypropoxylated methyldiethanolamine (molecular weight 1000); polypropoxylated methyldiethanolamine (molecular weight 2000); polyesters having tertiary amino groups; tri-[2-hydroxypropyl-(1)]-amine; N,N-di-n-(2,3-dihydroxy-propyl)-aniline; N,N'-dimethyl-N,N'-bisethoxyhydrazine and N,N'-dimethyl-N,N'-bis-propoxy-ethylene diamine.

(c) Amino alcohols, e.g. the products of the addition of alkylene oxide and acrylonitrile to primary amines, which addition products are obtained byhydrogenation, such as N-methyl-N-(3-aminopropyl)ethanolamine; N-cyclohexyl-N-(3-aminopropyl)-propanol-(2)-amine; N,N-bis-(3-aminopropyl)-ethanolamine and N-3-aminopropyl-diethanolamine.

(d) Amines, e.g. N,N-dimethylhydrazine; N,N-dimethylethylenediamine; 1-di-ethylamino-4-amino-pentane; α-aminopyridine; 3-amino-N-ethylcarbazole; N,N-dimethyl-propylene-diamine; N-amino-propyl-piperidine; N-aminorpopyl-morpholine; N-aminopropylethyleneimine and 1,3-bis-piperidino-2-aminopropane.

(e) Diamines triamines, amides, in particular the products obtained by hydrogenation of the products of chemical addition of acrylonitrile to primary or disecondary amines, e.g. bis-(3-aminopropyl)-methylamine; bis-(3-aminopropyl)-cyclohexylamine; bis-(3-aminopropyl) aniline; bis-(3-aminopropyl)-toluidine; diaminocarbazole, bis-(aminopropoxyethyl)-butylamine; tris-(aminopropyl)-amine or N,N'-bis-carbonamidopropyl-hexamethylenediamine as well as the compounds obtainable by chemical addition of acrylamide to diamines or diols.

(2) Compounds which contain either halogen atoms capable of quaternizing reactions or corresponding esters of strong acids:

2-Chloroethanol; 2-bromoethanol; 4-chlorobutanol; 3-bromopropanol; β-chloroethylamine; 6-chlorohexylamine; ethanolamine-sulphuric acid ester; N,N-bis-hydroxyethyl-N'-m-chloromethylphenylurea; N-hydroxyethyl-N'-chlorohexylurea, glycerolaminochloroethyl-urethane; chloroacetyl-ethylene diamine; bromoacetyl-dipropylene triamine; trichloroacetyl-triethylene tetramine; glycero-α-bromohydrin; polypropoxylated glycero-α-chlorohydrin; polyesters containing aliphatically bound halogen or 1,3-dichloropropanol-2.

The following are suitable isocyanates: Chlorohexylisocyanate; m-chlorophenyl-isocyanate; p-chlorophenylisocyanate; bis-chloromethyl-dophenylmethane diisocyanate, 2,4-diisocyanatobenzylchloride; 2,6-diisocyanatobenzyl chloride and N-(4-methyl-3-isocyanatophenyl)-β-bromoethylurethane.

(3) Compounds containing carboxylic acid or hydroxyl groups which are capable of salt formation:

(a) Hydroxycarboxylic and mercaptocarboxylic acids: Glycollic acids; thioglycollic acid, lactic acid, trichlorolactic acid; malic acid, dihydroxymaleic acid, dihydroxy- fumaric acid; tartaric acid; dihydroxytartaric acid, music acid, saccharic acid, citric acid, glyceroboric acid, pentaerythritoboric acid, mannitoboric acid, salicyclic acid, 2,6-dihydroxybenzoic acid; protocatechuic acid, α-resorcyclic acid, β-resorcyclic acid, hydroquinone-2,5-dicarboxylic acid, 4-hydroxy-isophthalic acid; 4,6-dihydroxy-isophthalic acid, hydroxyterephthalic acid; 5,6,7,8-tetrahydro-naphthol-(2)-carboxylic acid-(3); 1-hydroxynaphthoic acid-(2); 2,8-dihydroxy-naphthoic acid-(3); β-hydroxypropionic acid; m-hydroxybenzoic acid; pyrazolone carboxylic acid; uric acid; barbituric acid; resols and other phenol-formaldehyde condensation products.

(b) Polycarboxylic acids: Sulphone diacetic acids; nitrotriacetic acid; ethylene diaminotetracetic acid; diglycollic acid; thiodiglycollic acid; methylene-bis-thioglycollic acid; malonic acid; oxalic acid, succinic acid; glutaric acid; adipic acid; maleic acid; fumaric acid; gallic acid; phthalic acid; tetrachlorophthalic acid; isophthalic acid; terephthalic acid; naphthalene-1,4,5,8-tetracarboxylic acid; o-tolylimido-diacetic acid; β-naphthylimido-diacetic acid; pyridinodicarboxylic acid and dithiodipropionic acid.

(c) Aminocarboxylic acids: Oxaluric acid; anilinoacetic acid; 2-hydroxy-carbazolecarboxylic acid-(3); glycine; sarcosine; methionine; α-alanine; β-alanine; 6-aminocaproic acid; 6-benzoylamino-2-chloroacaproic acid; 4-aminobutyric acid, aspartic acid, glutamic acid; histadine; anthranilic acid, 2-ethylaminobenzoic acid, N-(2-carboxyphenyl)-aminoacetic acid; 2-(3'-aminobenzenesulphonylamino)-benzoic acid; 3-aminobenzoic acid; 4-aminobenzoic acid; N-phenylaminoacetic acid; 3,4-diaminobenzoic acid; 5-aminobenzene-dicarboxylic acid an 5-(4'-aminobenzoylamino)-2-amino-benzoic acid.

(d) Hydroxysulphonic and carboxylsulphonic acids: 2-Hydroxyethanesulphonic acid; phenolsulphonic acid-(2); phenolsulphonic acid-(3); phenolsulphonic acid-(4); phenol disulphonic acid-(2,4); sulphacetic acid, m-sulphobenzoic acid; p-sulphobenzoic acid; benzoic acid-(1)-sulphonic acid-(3,5); 2-chlorobenzoic acid-(1)-sulphonic acid-(4); 2-hydroxybenzoic acid-(1)-sulphonic acid-(5); naphthol-(1)-sulphonic acid; naphthol-(1)-disulphonic acid; 8-chloronaphthol-(1)-disulphonic acid; naphthol-(1)-trisulphonic acid; naphthol-(2)-sulphonic acid-(1); naphthol-(2)-trisulphonic acid; 1,7-dihydroxy-naphthalene sulphonic acid-(3); 1,8-dihydroxynaphthalene-disulphonic acid-(2,4); chromotropic acid; 2-hydroxynaphthoic acid-(3)-sulphonic acid-(6) and 2-hydroxycarbazole-sulphonic acid-(7).

(e) Aminosulphonic acids: Amidosulphonic acid; hydroxylamino-monosulphonic acid; hydrazine disulphonic acid; sulphanilic acid; N-phenylaminomethanesulphonic acid; 4,6-dichloroaniline-sulphonic acid-(2); phenylenediamine-(1,3)-disulphonic acid-(4,6); N-acetyl naphthylamine-(1)-sulphonic acid-(3); naphthylamine-(1)-sulphonic acid; naphthylamine-(2)-sulphonic acid; naphthylamine-disulphonic acid; naphthylamine-trisulphonic acid; 4,4'-di-(p-aminobenzoylamino)-diphenylurea-disulphonic acid (3,3'); phenylhydrazine-disulphonic acid-(2,5); 2,3-dimethyl-4-aminoazobenzene-disulphonic acid-(4',5); 4'-aminostilbene-disulphonic acid-(2,2')- 4-azo-4-anisole; carbazole-disulphonic acid-(2,7); taurine; methyltaurine; butyltaurine, 3-amino-benzoic acid-(1)-sulphonic acid-(5); 3-aminotoluene-N-methane-sulphonic acid; 6-nitro-1,3-dimethylbenzene-4-sulphamic acid; 4,6-diaminobenzene-disulphonic acid-(1,3); 2,4-diaminotoluene-sulphonic acid-(5); 4,4'-diaminodiphenyl-disulphonic acid-(2,2'); 2-aminophenolsulphonic acid-(4); 4,4'-diamino-diphenylether-sulphonic acid-(2); 2-aminoanisole-N-methane-sulphonic acid and 2-aminodiphenylamine-sulphonic acid.

The salt forming agents for Group 1 may be inorganic or organic acids or compounds containing reactive halogen atoms or corresponding esters of strong acids. The following are examples of such compounds: Hydrochloric acid; nitric acid; hypophosphorous acid; amidosulphonic acid; hydroxylamine monosulphonic acid; formic acid; acetic acid; glycollic acid; lactic acid; chloroacetic acid; ethylbromoacetate; sorbitoboric acid; methylchloride; butyl bromide; dimethylsulphate; diethyl sulphate; benzyl chloride; p-toluenesulphonic acid methyl ester; methyl bromide; ethylene chlorohydrin; ethylene bromohydrin; glycero-α-bromohydrin; ethylchloroacetate; chloroacetamide; bromoacetamide; dibromoethane; chlorobromobutane; dibromobutane; ethylene oxide; propylene oxide and 2,3-epoxypropanol.

The compounds of Group 2 may be quaternised or ternised with tertiary amines or with sulphides or phosphines to convert them into quaternary ammonium or phosphonium salts or ternary sulphonium salts.

Examples include, inter alia, trimethylamine, triethylamine, tributylamine; pyridine, triethanolamine; the compounds mentioned under Groups 1a and 1b; dimethylsulphide; diethylsulphide, thiodiglycol; thiodiglycollic acid; trialkylphosphines; alkylarylphosphines and triarylphosphines.

The salt-forming reactants used for compounds of Group 3 may be inorganic bases, e.g. sodium hydroxide; potassium hydroxide; potassium carbonate; sodium bicarbonate; ammonia and primary, secondary and tertiary amines. Lastly, it should be mentioned that organic phosphorous compounds may also be used as compounds capable of salt formation. These include both basic phosphines which can be built into the molecule such as diethyl-β-hydroxyethylphosphine; methyl-bis-β-hydroxyethylphosphine or tirs-β-hydroxymethylphosphine and derivatives such as phosphinic acids, phosphonous acids and phosphonic acids as well as esters of phosphorous and phosphoric acid and their thioanalogues, e.g. bis-(α-hydroxyisopropyl)-phosphinic acid, hydroxyalkane phosphonic acid or phosphoric acid-bis-glycol ester.

Cationic polyurethanes suitable according to the invention may be obtained for example, by the process according to German Auslegeschrift No. 1,270,276, if the starting materials used for synthesising the polyurethane include at least one component having one or more basic tertiary nitrogen atoms and the basic tertiary nitrogen atoms of the polyurethane are reacted with alkylating agents or inorganic or organic acids. It is in principle immaterial in what position of the polyurethane macromolecule the basic nitrogen atoms are situated.

Conversely, polyurethanes having reactive halogen atoms capable of quaternising reactions may be reacted with tertiary amines. Furthermore, cationic polyurethanes may also be prepared by a reaction resulting in a chain lengthening quaternisation, for example by preparing dihalogen urethanes from optionally higher molecular weight diols and isocyanates having reactive halogen atoms or diisocyanates and halogenated alcohols and reacting these dihalogen urethanes with ditertiary amines. Conversely, dietertiary diaminourethanes may be prepared from compounds having two isocyanate groups and tertiary amino alcohols. These diaminourethanes may then be reacted with reactive dihalogen compounds. The cationic polyurethane mass may, of course, also be prepared from a cationic salt-type starting component, for example a quaternised basic polyether or an isocyanate which contains tertiary nitrogen. These methods of preparation have been described, for example, in German Auslegeschriften Nos. 1,184,946; 1,178,586 and 1,179,363; U.S. Pat. No. 3,686,108 and Belgian Pat. Nos. 653,223; 658,026 and 636,799. These documents also mention suitable starting materials for synthesising the salt-type polyurethanes.

The anionic polyurethane(urea) dispersions may also be prepared by known methods. Suitable anionic polyurethanes have been described, for example, in German Auslegeschrift No. 1,237,306 and German Offenlegungsschriften Nos. 1,570,565; 1,720,639 and 1,495,847. It is preferred to use starting compounds which contain carboxyl or sulphonate groups as ionic groups.

The anionic dispersions may also be prepared from polyurethanes having free hydroxyl and/or amino groups by reacting them with aliphatic or aromatic aldehydes and, at the same time or subsequently, with a metal sulphite, metal hydrosulphite, metal aminocarboxylate or metal aminosulphate. Lastly, polyurethanes having free hydroxyl and/or amino groups may be reacted with cyclic compounds which have from 3 to 7 ring members and contain salt-type groups or groups which are capable of salt formation after ring opening as described in German Auslegeschrift No. 1,237,306. Compounds of this kind include in particular sultones such as 1,3-propanesultone, 1,4-butanesultone or 1,8-naphthosultone; lactones such as β-propiolactone or γ-butyrolactone and dicarboxylic acid anhydrides, e.g. succinic acid anhydride.

Suitable cationic or anionic polyurethanes for the process according to the invention may also be prepared via a formaldehyde polycondensation reaction according to German Offenlegungsschrift No. 1,770,068. According to this method higher molecular weight polyisocyanates are reacted with an excess of compounds which have methylol end groups, e.g. aminoformaldehyde resins or phenol formaldehyde resins, and the resulting reaction product which contains methylol groups is dispersed in water and finally cross-linked by heat treatment with the formation of methylene bridges.

It is also possible, but less desirable, to carry out the process according to the invention using products described in German Offenlegungsschriften Nos. 1,953,345; 1,953,348 and 1,953,349. These are aqueous dispersions of ionic emulsion polymers prepared by radical emulsion polymerisation of olefinically unsaturated monomers in the presence of cationic or anionic oligourethanes or polyurethanes.

Chemically cross-linked aqueous dispersions of cationic or anionic polyurethanes which tend to sediment but are re-dispersible may also be used according to the invention.

A detailed description of the preparation of cross-linked ionic polyurethane suspensions may be found, for example, in German Auslegeschriften Nos. 1,495,745 (U.S. Pat. No. 3,479,310), 1,282,962 (Canadian Pat. No. 837,174) and 1,694,129 (British Pat. No. 1,158,088) and in German Offenlegungsschriften Nos. 1,595,687 (U.S. Pat. No. 3,714,095), 1,694,148 (U.S. Pat. No. 3,622,527), 1,729,201 (British Pat. No. 1,175,339) and 1,770,068 (U.S. Pat. No. 3,756,992).

As already mentioned above, non-ionic, self-emulsifying aqueous polyurethane dispersions may also be used for the process according to the invention in addition to cationic and anionic polyurethane dispersions.

The preparation of non-ionic, emulsifier-free polyurethane dispersions which are suitable for the process according to the invention may be carried out, for example, by the process according to German Offenlegungsschrift 2,141,807 e.g.

1 Mol of a trifunctional polyether polyol is reacted with 3 mols of a diisocyanate. The resulting adduct, which contains isocyanate groups, is reacted with a mixture of (a) a monofunctional low molecular weight alcohol and (b) a reaction product of a monofunctional alcohol or monocarboxylic acid and ethylene oxide (molecular weight about 600)to yield a prepolymer containing 1 mol of the monofunctional polyethylene oxide adduct to about 3000 molecular weight units. This prepolymer is emulsified in water with the aid of a mechanical dispersing device to produce a latex which is subjected to the final polymerisation by reaction with water or some other chain lengthening agent known from polyurethane chemistry. The latices are prepared using such a small quantity of water that the solids content is above 45% weight and preferably above 50% by weight.

According to earlier proposals by the present applicants in German Offenlegungsschriften Nos. 2,314,512; 2,314,513 and 2,320,719, self dispersible, non-ionic polyurethane dispersions suitable for the process according to the invention may also be prepared by incorporating polyethylene oxide units into linear polyurethanes as side chain units attached by allophanate or biuret groups.

Suitable polymer latices include, for example, those based on natural or synthetic rubber, styrene-butadiene copolymers, neoprene, styrene-acrylonitrile copolymers, polyethylene, chlorosulphonated or chlorinated polyethylene, butadiene-acrylonitrile copolymers, butadiene-methacrylate copolymers, polyacrylic acid esters, PVC and copolymers of ethylene and vinyl acetate which may be partially saponified. Examples of such polymer latices may be found, for example, in U.S. Pat. No. 2,993,013 and German Offenlegungsschrift No. 2,014,385.

Examples of polycondensate dispersions include the aminoplast or phenoplast dispersions which may contain ionic groups as described in German Offenlegungsschrift No. 2,324,134. Methylolated polycondensate dispersions prepared using an excess of formaldehyde may also be used.

According to a special embodiment of the present invention, the polymers or polycondensates may first be prepared in situ in the dispersing agent containing hydroxyl groups and the polyisocyanate-polyaddition reaction may then be carried out in the same reaction vessel.

Although the polyurethanes, polymers, polycondensation products or mixtures thereof are preferably used in the form of their aqueous dispersions or solutions in the process according to the invention, they may also be introduced into the reaction vessel as dispersions or solutions in non-aqueous dispersing agents or solvents, water being then added before the polyisocyanate-polyaddition reaction, e.g. together with the amino compounds.

The non-aqueous dispersing agents or solvents, if used, are preferably the same as those used as dispersing agent for the in situ polyaddition reaction, e.g. the low molecular weight polyols or higher molecular weight polyethers, polyesters, polycarbonates and polyacetals containing hydroxyl groups, which are described in detail below. In special cases, organic or aqueous organic solvents or dispersing agents (preferably with boiling points below 150° C.) may be used, for example an acetonic solution or dispersion with or without the addition of water for dilution.

The great advantage of the present process is that the polyurethane resins produced from the dispersions obtainable according to the invention can be optimally improved and modified in their properties exactly as desired by suitable choice of their starting compounds because of the very wide range of possible reactants available for selection.

In another variation of the process according to the invention, aqueous solutions of ionic polyurethanes are used instead of aqueous polymer dispersions, for example, those described in the publication mentioned above by D. Dieterich et al in Angewandte Chemie 82, 1970, pages 53–63.

The various starting components used in the present process are selected depending on the proposed use of the polyurethanes prepared from the modified polyhydroxyl compounds obtainable by the process. If, for example, it is desired to modify a relatively hard, brittle polyurethane in order to increase its impact strength, an aqueous dispersion of a highly elastic polyurethane, polymer or polycondensate should be used. It is thereby possible not only substantially to reduce the general brittleness of the end product but also to increase the elasticity of the surface zones which are particularly liable to be damaged by impact, for example in the case of a foam product.

It is, of course, also possible to proceed conversely on the same principle and to modify a relatively soft polyurethane product by means of a dispersion of a relatively hard polyurethane, polymer or polycondensation product. It is possible in this way to optimize both the hardness and the tensile strength of the end product. In addition, the stability of the product to light can be improved, for example when using finely disperse particles of polyhydrazodicarbonamides.

Foams with ionic groups which have increased hydrophilic character can be obtained by using polyhydroxyl compounds which contain ionic polymers.

Foams which have been rendered hydrophilic in this way can be wetted more easily, for example. Depending on their hydrophilic character, they can also absorb larger quantities of water than conventional foam products. They may also be used as ion exchangers, for example.

A further advantage of the process according to the invention is that when polyhydroxyl compounds containing, for example, ionic polyisocyanate polyaddition products, are used in the production of polyester urethane foams, the emulsifying agents normally required can be omitted. The ionic polyurethane molecules introduced into the reaction mixture evidently act as internal dispersing agents.

According to another possible variation of the present invention, polyisocyanate polyaddition products dispersed in the polyhydroxyl compounds are subsequently cross-linked with formaldehyde in known manner in the pressure of catalytic quantities of acids. It is surprisingly found that cross-linked dispersions of this kind are also finely disperse and stable in storage.

The special importance of the present invention lies in the fact that all the above-mentioned improvements and modifications in the properties of polyurethane resins can be obtained using the usual raw materials and conventional, in most cases standardized, formulations.

The following discussion concerns the basic process described in the copending applications identified above.

The compounds used as component (2) are preferably polyamines and/or hydrazines and/or hydrazides.

In another embodiment of the process reactants (1) and/or (2) may in part consist of monoisocyanates and/or primary or secondary monoamines and/or monohydrazides for the purpose of adjusting the product to a given molecular weight. Hydroxyalkylamines may also be used in the polyaddition reaction for the same purpose. In this way there are also obtained polyurea or polyhydrazodicarbonamide particles containing reactive groups.

A certain proportion of substances which have an emulsifying action and stabilize the dispersion, such as polyethers containing amino, semicarbazide or hydrazide groups, may also be used.

Hitherto unknown stable dispersions have also been found which have a solids content of from 10 to 60% by weight, of polyureas or polyhydrazodicarbonamides in hydroxyl compounds having a molecular weight of between 62 and 400 or in hydroxyl compounds essentially consisting of more than 30% by weight and preferably more than 50% by weight of polyesters and/or polyester amides and/or polycarbonates having a molecular weight of between 400 and 12,000, preferably between 800 and 8000.

The dispersing agents (component 3) are the substances forming the external continuous phase in the present invention. They include alcohols having a molecular weight of from about 62 to about 16,000, preferably from 62 to 12,000, and most preferably 106 to 8000 containing from 1 to 8, preferably from 2 to 6 and most preferably from 2 to 4 primary and/or secondary hydroxyl groups.

These include, for example, both low molecular weight alcohols or glycols having a molecular weight of between about 62 and about 400 and which may also contain ether, thioether or ester bonds and polyesters, polyethers, polythioethers, polyacetals, polycarbonates and polyester amides having molecular weights of more than 400, such as those known per se for the production of polyurethanes.

Suitable low molecular weight dispersing agents include monohydric alcohols such as butanol, 2-ethylhexanol, amyl alcohol and ethylene glycol monoethylether. Diols or triols of the kind conventionally used as chain lengthening agents or cross-linking agents in polyurethane chemistry are also suitable, e.g. propylene glycol-(1,2) and -(1,3), butylene glycol-(1,4) and -(2,3); hexanediol-(1,6); octane diol-(1,8); neopentyl glycol; cyclohexane dimethanol (1,4-bis-hydroxymethylcyclohexane); 2-methyl-1,3-propanediol; glycerol; trimethylolpropane; hexane triol-(1,2,6) butanetriol-(1,2,4) or trimethylolethane, and particularly glycols having a hydrophilic character, e.g. ethylene glycol; diethyleneglycol; triethylene glycol or tetraethylene glycol and polyethylene glycols having a molecular weight of up to 400. In addition compounds such as dipropylene glycol, polypropylene glycols having a molecular weight of up to 400, dibutylene glycol, polybutylene glycols having a molecular weight of up to 400, thiodiglycol and castor oil may also be used as dispersing agents. Also suitable are ester diols of the general formulae HO—(CH$_2$)$_x$—CO—O—(CH$_2$)$_y$—OH and HO—(CH$_2$)$_x$—O—CO—R—O—O—(CH$_2$)$_x$—OH in which R represents an alkylene or arylene group having from 1 to 10 preferably 2 to 6 carbon atoms,
x=2 to 6 and
y=3 to 5, e.g. δ-hydroxybutyl-ε-hydroxy-caproic acid ester; ω-hydroxyhexyl-γ-hydroxybutyric acid ester; adipic acid-bis-(β-hydroxyethyl) ester and terephthalic acid-bis-(β-hydroxyethyl)-ester; as well as diolurethanes of the general formula HO—(CH$_2$)$_x$—O—CO—NH—R'—N-
H—CO—O—(CH$_2$)$_x$—OH in which
R' represents an alkylene, cycloalkylene or arylene group having from 2 to 15, preferably 2 to 6 carbon atoms and
x represents an integer of from 2 to 6, e.g. 1,6-hexamethylene-bis-(β-hydroxyethylurethane) or 4,4'-diphenylmethane-bis-(δ-hydroxybutylurethane).

Also suitable are diol ureas of the general formula

HO—(CH$_2$)$_x$—N—CO—NH—R''—NH—CO—N—(CH$_2$)$_x$—OH
           |                              |
           R'''                           R''' in which
R'' represents an alkylene, cycloalkylene or arylene group having from 2 to 15 and preferably 2 to 9 carbon atoms,
R''' represents hydrogen or a methyl group and
x=2 or 3, e.g. 4,4'-diphenylmethane-bis-(β-hydroxyethylurea) or the compound

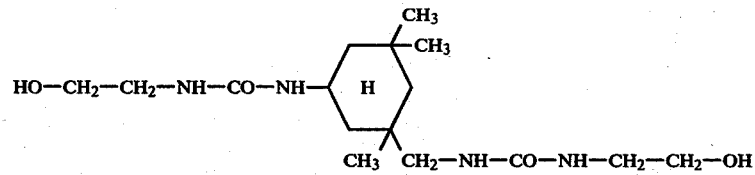

Particularly suitable among the dihydric and trihydric low molecular weight alcohols are those which, either alone or as mixtures or with the addition of higher molecular weight alcohols, are liquid at temperatures below 50° C.

It has been found that in some cases when low molecular weight dispersing agents are used and where substantially linear polyisocyanate addition compounds are synthesized, solutions of the polyaddition product rather than dispersions are formed. In this context, solution means a clear, uniform and homogeneous mixtures of polyaddition product and dispersing agent. Such solutions are not intended to be covered by the term "dispersion" as used throughout the specification. It has been found, however, that formation of a solution can be easily avoided by the presence of small amounts of water in the dispersing agent. Generally, an amount of water of about 1%, by weight, based on the total weight of the dispersion is sufficient to avoid the formation of a solution. However, as set forth below, the amount of water in the dispersions may be varied within wide limits depending on the particular system involved and the intended use. In most cases, however, the dispersions may be made completely water-free without being undesirably converted into solutions.

Higher molecular weight hydroxyl polyesters which are suitable as dispersing agents include e.g. reaction products of polyhydric, preferably dihydric alcohols to which trihydric alcohols may be added and polybasic, preferably dibasic carboxylic acids. Instead of free polycarboxylic acids, the corresponding polycarboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid; adipic acid; suberic acid; azelaic acid; sebacic acid, phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid; which may be mixed with monomeric fatty acids; dimethyl terephthalate and bis-glycolterephthalate. Suitable polyhydric alcohols include e.g. ethylene glycol; propylene glycol-(1,2) and -(1,3); butylene glycol-(1,4) and -(2,3); hexanediol-(1,6); octane-diol-(1,8); neopentylglycol; cyclohexanedimethanol (1,4-bis-hydroxymethylcyclohexane); 2-methyl-1,3-propanediol; glycerol, trimethylolpropane; hexanetriol-(1,2,6); butanetriol-(1,2,4); trimethylolethane; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, e.g. ε-caprolactam, or hydroxycarboxylic acids, e.g. ω-hydroxycaproic acid, may also be used.

The higher molecular weight polyethers which are preferably used as dispersing agents are obtained in known manner by reaction of the starting compounds which contain reactive hydrogen atoms with alkylene oxides such as ethylene oxide; propylene oxide; butylene oxide; styrene oxide; tetrahydrofuran or epichlorohydrin or with any mixtures of these alkylene oxides. In many cases, it is preferred to use polyethers which contain predominantly primary hydroxyl groups.

Suitable starting compounds containing reactive hydrogen atoms include e.g. water; methanol; ethanol; ethylene glycol; propylene glycol-(1,2) or -(1,3); butylene glycol-(1,4) or -(2,3-; hexanediol-(1,6); octanediol-(1,8); neopentyl glycol; 1,4-bis-hydroxymethylcyclohexane; 2-methyl-1,3-propanediol; glycerol; trimethylolpropane; hexanetriol-(1,2,6); butanetriol-(1,2,4); trimethylolethane; pentaerythritol; mannitol; sorbitol; methyl glycoside; sucrose; phenol; isononylphenol; resorcinol; hydroquinone; 1,2,2- or 1,1,3-tris-(hydroxyphenyl)-ethane; ammonia; methylamine; ethylene diamine; tetra- or hexamethylene diamine; diethylenetriamine; ethanolamine; diethanolamine; triethanolamine; aniline; phenylenediamine; 2,4- and 2,6-diaminotoluene and polyphenylpolymethylene polyamines of the kind obtained by aniline-formaldehyde condensation. Resinous materials such as phenol and resol resins may also be used as the starting materials.

Polyethers modified by vinyl polymers are also suitable for the process according to the invention. Products of this kind may be obtained by polymerizing, e.g. styrene and acrylonitrile in the presence of polyethers (U.S. Pat. Nos. 3,383,351; 3,304,273; 3,523,095; 3,110,695 and German Pat. No. 1,152,536).

Among the polythioethers which should be particularly mentioned are the condensation products obtained from thiodiglycol on its own and/or with other glycols, dicarboxylic acids, formaldehyde, aminocarboxylic acids or aminoalcohols. The products obtained are either polythiomixed ethers, polythio ether esters or polythioether ester amides, depending on the cocomponents.

Suitable polyacetals include the compounds which can be prepared from glycols such as diethylene glycol; triethylene glycol; 4,4'-dioxethoxy-diphenyldimethylene; hexanediol and formaldehyde. Suitable polyacetals may also be prepared by the polymerization of cyclic acetals.

Polycarbonates containing hydroxyl groups include those known per se such as the products obtained from the reaction of diols such as propanediol-(1,3), butanediol-(1,4) and/or hexanediol-(1,6), diethyleneglycol, triethylene glycol or tetraethylene glycol with diarylcarbonates, e.g. diphenylcarbonate, or phosgene.

Suitable polyester amides and polyamides include the predominantly linear condensates obtained from polyvalent saturated and unsaturated carboxylic acids or their anhydrides and polyvalent saturated and unsaturated amino alcohols, diamines, polyamines or mixtures thereof.

As previously mentioned, mixtures of the above mentioned high molecular weight and low molecular weight dispersing agents may of course also be used.

The dispersing agents which are preferred are those which are free from any labile groups (e.g. ester groups) which are liable to be destroyed by hydrolysis or aminolysis in the process. Compounds of this kind are preferably only added to the finished dispersion after completion of the polyaddition reaction.

The hydroxyl compounds and mixtures thereof used as dispersing agents should be chosen so that when mixed with the water to be added, with any hydroxyl compounds or preferably amino compounds used as component 2, and optionally inert solvents, they are liquid at the reaction temperature, i.e. in the form of solutions or emulsions. Their viscosity at the reaction temperature should generally be below 20,000 cP and preferably below 5000 cP so that conventional stirrer and mixing apparatus can be employed.

If inert solvents are to be used, they should preferably distill off as azeotropic mixtures with water, for example, benzene and toluene.

The isocyanate reactive components 2 used for the preparation of the dispersions are mainly polyamines, hydrazines and hydrazides. Suitable polyamines include divalent and/or higher valent primary and/or secondary aliphatic, araliphatic, cycloaliphatic and aromatic amines, e.g. ethylene diamine; 1,2- and 1,3-propylene diamine; tetramethylenediamine; hexamethylenediamine; dodecamethylene; diamine; dimethyldiaminohexane; N,N'-dimethylethylenediamine; 2,2-bis-aminopropylmethylamine; higher homologues of ethylene diamine such as diethylenetriamine; triethylenetetramine and tetraethylenepentamine; homologues of propylenediamine such as dipropylenetriamine; piperazine; N,N'-bis-aminoethylpiperazine; triazine; 4-aminobenzylamine; 4-aminophenylethylamine; 1-amino-3,3,5-trimethyl-5-aminomethylcyclohexane; 4,4'-diaminodicyclohexyl-methane and -propane; 1,4- diaminocyclohexane; phenylenediamines; naphthylene diamines; condensates of aniline and formaldehyde; tolylene diamines; bis-aminomethylbenzene and derivatives of the above mentioned aromatic amines monoalkylated on one or both nitrogen atoms. The polyamines generally have a molecular weight of from about 60 to about 10,000, preferably 60 to 3000 and most preferably 60 to 1000.

Suitable hydrazines include hydrazine itself and monosubstituted or N,N'-disubstituted hydrazines in which the substituents may be $C_1$ to $C_6$ alkyl groups, cyclohexyl groups or phenyl groups. The hydrazines generally have a molecular weight of from 32 to 500. Hydrazine itself is preferred.

Suitable hydrazides include the hydrazides of divalent or higher valent carboxylic acids such as carbonic acid, oxalic acid, malonic acid, succinic acid, adipic acid, sebacic acid, axelaic acid, maleic acid, fumaric acid, phthalic acid, isophthalic acid or terephthalic acid; the esters of hydrazine monocarboxylic acids with divalent or higher valent alcohols and phenols such as ethanediol, propanediol-(1,2), butanediol-(1,2), -(1,3), and -(1,4), hexanediol, diethylene glycol, triethyleneglycol, tetraethylene glycol, dipropylene glycol, tripropyleneglycol and hydroquinone as well as the amides of hydrazine monocarboxylic acid (semi-carbazides), e.g. with the above mentioned diamines and polyamines. The hydrazides used generally have a molecular weight of from about 90 to about 10,000, preferably 90 to 3000 and most preferably from 90 and 1000.

The amines and hydrazines mentioned above may either be used in the form of their dilute aqueous solutions or as mixtures with the dispersing agent diluted with the necessary quantity of water.

According to a special embodiment of the process of the present invention, a stable, finely divided and relatively low viscosity dispersion may be produced which is the reaction product of a polyisocyanate, aqueous ammonia and optionally other amino functional compounds dispersed in a polyhydroxyl compound as dispersing agent. The resulting bis-urea may subsequently be converted into a high molecular weight polymethylene urea by cross-linking with formaldehyde.

These polymethylene ureas also form finely divided, stable and low viscosity dispersions in the hydroxyl compound used as dispersing agent.

The quantity of polyisocyanate used in this embodiment of the process according to the invention is generally 0.5 to 1.5, preferably 0.9 to 1.2 and most preferably 1.0 equivalents of polyisocyanate per mol of ammonia. If other amino functional compounds are used in addition to ammonia, it is of course necessary to use an additional quantity of polyisocyanate approximately equivalent to these amino functional compounds.

According to the invention, aqueous ammonia solution is preferred to anhydrous ammonia as starting component 2, partly because aqueous ammonia is in practice easier to use and partly because any additional amino compounds used are then more easily distributed in the dispersing agent because of the presence of water. Moreover, the polyadduct formed as solid phase has less tendency to agglomeration, so that the finished dispersion is much more stable.

It is surprising that the bisureas (or trisureas if trifunctional isocyanates are used) prepared in situ from stable dispersions in the hydroxyl compounds because if, for comparison, urea is introduced in the form of an aqueous solution into a polyhydroxyl compound and the water is subsequently removed by distillation, urea crystallizes in the form of coarse needles. Such a suspension of urea crystals cannot be used as a starting component for the production of polyurethane resins.

In a preferred variation of the process of the invention, the bisurea or trisurea dispersion prepared in situ is cross-linked to a polymethylene urea by means of formaldehyde in the presence of a catalytic quantity of an acid or alkali in known manner, as described, for example, in German Offenlegungsschrift 2,324,134. The quantity of formaldehyde used for this purpose is generally 0.2 to 3 mol, preferably 0.4 to 1.5 mol, most preferably 0.5 to 0.8 mol per equivalent of urea groups.

According to the invention, the formaldehyde may also be added at the same time as the ammonia solution. The products then obtained are different in their physical properties from those obtained by the above described process where there is subsequent cross-linking with formaldehyde. They are disperse systems with a microgel character. In this variation of the process of the invention, it is necessary to ensure either that all of the components are mixed together at the same time or that the polyisocyanate is introduced into the reaction mixture immediately after the formaldehyde and ammonia solution has been mixed in the dispersing agent, i.e. before ammonia and formaldehyde have reacted to form urotropin.

Suitable starting components 1 include aliphatic, cycloaliphatic, araliphatic, aromatic and heterocyclic polyisocyanates such as those described, for example, by W. Siefken in Justus Liebigs Annalen der Chemie, 562, pages 75 to 136, for example, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and any mixtures of these isomers; 1-isocyanato-3,3,5-trimethyl-5-isocyanatomethylcyclohexane as described in German Auslegeschrift No. 1,202,785 and U.S. Pat. No. 3,401,190; 2,4- and 2,6-hexahydrotolylene diisocyanate and any mixtures of these isomers; hexahydro-1,3- and/or -1,4-phenylene diisocyanate; perhydro-2,4'- and/or -4,4'-diphenylmethane diisocyanate; 1,3- and 1,4-phenylenediisocyanate; 2,4- and 2,6-tolylene diisocyanate and any mixtures of these isomers; diphenylmethane-2,4'- and/or 4,4'-diisocyanate, naphthylene-1,5-diisocyanate; triphenylmethane-4,4',4''-triisocyanate; polyphenyl-polymethylene polyisocyanates of the kind which can be obtained by aniline formaldehyde condensation followed by phosgenation and which have been described, for example, in British Pat. Nos. 874,430 and 848,671, m- and p-isocyanatophenylsulphonylisocyanates according to U.S. Pat. No. 3,454,606; perchlorinated aryl polyisocyanates such as those described e.g. in German Auslegeschrift No. 1,157,601 and U.S. Pat. No. 3,277,138; polyisocyanates containing carbodiimide groups as described in German Pat. No. 1,092,007 and U.S. Pat. No. 3,152,162; diisocyanates of the kind described in U.S. Pat. No. 3,492,330, polyisocyanates having allophanate groups as described, e.g. in British Pat. No. 994,890; Belgian Pat. No. 761,626 and published Dutch Patent Application No. 7,102,524; polyisocyanates having isocyanurate groups as described e.g. in U.S. Pat. No. 3,001,973; German Pat. Nos. 1,022,789; 1,222,067 an 1,027,394 and in German Offenlegungsschriften Nos. 1,929,034 and 2,004,048; polyisocyanates with urethane groups, e.g. as described in Belgian Pat. No. 752,261 and U.S. Pat. No. 3,394,164; polyisocyanates having acylated urea groups according to German Pat. No. 1,230,778; polyisocyanates with biuret groups as described e.g. in German Pat. No. 1,101,394; U.S. Pat. Nos. 3,124,605 and 3,201,372 and British Pat. No. 889,050 polyisocyanates prepared by telomerization reactions as described e.g. in U.S. Pat. No. 3,654,106; polyisocyanates with ester groups, for example, those mentioned in British Pat. Nos. 965,474 and 1,072,956; U.S. Pat. No. 3,567,763 and German Pat. No. 1,231,688; reaction products of the above mentioned isocyanates with acetals according to German Pat. No. 1,072,385 and polyisocyanates containing polymeric fatty acid group according to U.S. Pat. No. 3,455,883.

The distillation residues containing isocyanate groups obtained from the commercial production of isocyanates may also be used, if desired as solutions in one or more of the above mentioned polyisocyanates. Any mixtures of the above mentioned polyisocyanates may also be used.

It is generally preferred to use commercially readily available polyisocyanates, for example, 2,4- and 2,6-tolylene diisocyanate and any mixtures of these isomers ("TDI"); polyphenyl-polymethylene polyisocyanates which can be prepared by aniline-formaldehyde condensation followed by phosgenation ("crude MDI"); and polyisocyanates which have carbodiimide groups, urethane groups, allophanate groups, isocyanurate groups, urea groups or biuret groups ("modified polyisocyanates").

So-called prepolymers may, of course, also be used as isocyanate compounds, i.e. reaction products of low molecular weight and/or higher molecular weight compounds having hydroxyl and/or amino groups, e.g. those of the kind mentioned above, with an excess of the monomeric polyisocyanates described above.

Some or all of the isocyanates or amines, hydrazines or hydrazides used in the process may also have a functionality higher than 2. It must be regarded as surprising that the reaction according to the invention of such higher functional compounds in dispersing agents which have hydroxyl groups does not result in solid or at least very highly viscous reaction products but rather gives rise to finely divided, low viscosity dispersions.

The polyaddition products produced by the process which are dispersions in compounds containing hydroxyl groups may, as already mentioned above, be modified by the addition of a proportion of monofunctional isocyanates, amines, hydrazine derivatives.

Thus, for example, the average molecular weight of polyaddition products can be adjusted as desired by the incorporation of such monofunctional compounds. Polyureas or polyurea polyhydrazodicarbonamides containing free hydroxyl groups can be obtained by using alkanolamines having primary or secondary amino groups. The introduction of other groups such as ester groups, longer aliphatic groups, tertiary amino groups, active double bonds, etc. can also be achieved by the addition of suitably substituted monoamines, diamines or isocyanates.

Suitable monofunctional isocyanates include e.g. alkyl isocyanates such as methyl; ethyl; isopropyl; isobutyl; hexyl; lauryl and stearyl isocyanate; chlorohexyl isocyanate; cyclohexyl isocyanate; phenyl isocyanate; tolyl isocyanate; 4-chlorophenylisocyanate and diisopropylphenylisocyanate.

Suitable monoamines include e.g. alkylamines and dialkylamines containing $C_1$-$C_{18}$ alkyl groups; cycloaliphatic amines such as cyclohexylamine and its homologues; aniline and N-alkylanilines and aniline derivatives which are substituted in the benzene ring; alkanolamines such as ethanolamine, diethanolamine, propanolamine, dipropanolamine, butanolamine and dibutanolamine and diamines having a tertiary and a primary or secondary amino group, e.g. N,N-dimethylethylene-diamine and N-methylpiperazine. Suitable monofunctional hydrazine derivatives and hydrazides include e.g. N,N-dialkylhydrazines, the hydrazides of monocarboxylic acids, hydrazine monocarboxylic acid esters of monofunctional alcohols or phenols, and semicarbazides, e.g. methyl, ethyl, propyl, butyl, hexyl, dodecyl, stearyl, phenyl and cyclohexylsemicarbazide.

The molecular weight of the polyaddition products dispersed in the hydroxyl compounds is determined by the proportion by weight of ammonia, polyamine, hydrazine or hydrazide on the one hand to polyisocyanate on the other (and monofunctional compounds if added). It is particularly preferred to react approximately equivalent quantities of isocyanates and component 2 (preferably amino functional compounds) in the hydroxyl containing dispersing agents. Chain lengthening agents 2 which have primary hydroxyl groups are reacted in a dispersing agent containing exclusively secondary hydroxyl groups. A limited excess of isocyanate may also be used but the products then obtained have a relatively high viscosity, increasing with the amount of isocyanate excess used, since the excess of polyisocyanate reacts with the dispersing agent. Low molecular weight chain lengthening agents such as amines, hydrazines or hydrazides, on the other hand, may be used in large excess without causing an increase in the viscosity. Polyaddition products having reactive end groups and a limited molecular weight are obtained in such cases. The equivalent ratio of polyisocyanate to chain lengthening agent is generally kept between about 0.50 and about 1.50, preferably between 0.90 and 1.10. It is particularly preferred to use approximately equivalent quantities.

When polyisocyanates are reacted with polyamines, hydrazines or hydrazides in the presence of compounds having hydroxyl groups, the isocyanate groups react very preferentially with the amino groups but a certain proportion of the hydroxyl groups of the dispersing agent also take part in the reaction, depending on the reaction conditions. This reaction gives rise to polyurea and/or polyhydrazodicarbonamide chains which are chemically linked with the monohydric or, preferably, polyhydric alcohol used as dispersing agent. Such end groups presumably have a dispersing action on the solid particles. The extent to which the hydroxyl groups take part in the polyaddition reaction depends particularly on the reaction temperatures and on the water content. If too large a number of higher molecular weight polyol molecules react with the polyisocyanates, highly viscous dispersions are obtained. This occurs in the process described in German Auslegeschrift 1,260,142. On the other hand, if the proportion of polyol molecules taking part in the reaction is too low, the larger particles of the resulting dispersions are liable to be unstable and undergo sedimentation. The process of the present invention has the surprising effect of making it possible to adjust the proportion of the NCO/OH reaction so that finely divided dispersions having the required low viscosity are obtained but at the same time coarser particles in the dispersion are still sufficiently stable so that they will not undergo sedimentation even during prolonged storage at elevated temperatures.

If, however, the reaction is carried out using low viscosity polyethers containing exclusively secondary hydroxyl groups or less reactive (aliphatic) isocyanates, the proportion of polyol molecules taking part in the polyaddition reaction may be too low to result in a stable dispersion. In such cases it is advisable to include emulsifying substances in the polyaddition reaction so that the stability of the dispersion will be increased. These emulsifying substances include linear polyethers having an average molecular weight of 300 to 4000 and carrying isocyanate groups or amino or hydrazide groups at both ends of the chain or preferably only at one end.

For example, minor quantities of isocyanate adducts of diols having the following general formula

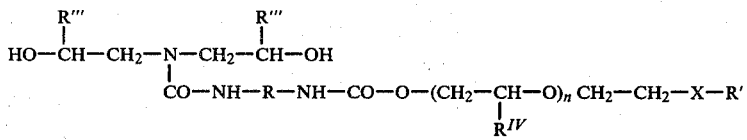

may be used as emulsifying agents. In the above formula,

R represents a divalent group such as can be obtained by removal of the isocyanate group from a diisocyanate having a molecular weight of from about 112 to about 1000;

X represents oxygen or $-NR''-$,

R' and R'', which may be the same or different, represent monovalent hydrocarbon groups having from 1 to 12 carbon atoms, R''' represents hydrogen or a monovalent hydrocarbon group having from 1 to 8 carbon atoms, $R^{IV}$ represents a hydrogen atom or a methyl group and n represents an integer of from 4 to 89.

The preparation of such emulsifying diols has been described, for example, in German Offenlegungsschrift 2,314,512.

Modified polyethers used as dispersing agents include those having the above general formula and also, for example, addition products of excess diisocyanates and/or polyisocyanates of the kind mentioned above with monofunctional and/or bifunctional hydroxyl polyethers having an average molecular weight of from 300 to 4000, which may be freed from unreacted free isocyanate by thin layer evaporation. If desired, these isocyanate prepolymers may also be reacted with excess free isocyanate to form allophanate isocyanates. Addition products containing isocyanate end groups may also be converted into polyethers containing amino or semicarbazide end groups by reaction with excess diamines or hydrazine, e.g. according to German Auslegeschrift Nos. 1,122,254 or 1,138,200.

Polyethers containing amino end groups, e.g. those prepared by the process according to U.S. Pat. No. 3,155,278 or German Auslegeschrift No. 1,215,373, may also be used as dispersing agents according to the invention.

Lastly, hydroxyl polyethers may be reacted with phosgene to convert them into chloroformic acid esters which may then be reacted with excess diamine or hydrazine. As already mentioned above, polyethers which carry an isocyanate or amino group at only one chain end are preferred as dispersing agents.

The modified polyethers which have a dispersing action are generally only added in quantities of up to about 15% by weight, preferably only up to 3% by weight (based on the total quantity of polyol and solid content) to the particularly preferred dispersions which have a solids content of about 10 to 60% by weight. If the dispersions have a higher or lower solids content, a correspondingly larger or smaller quantity of dispersing agent is used.

According to a less preferred variation of the process, compounds of the type mentioned above having two or more primary hydroxyl groups and a molecular weight of from 62 to 400 may be reacted with isocyanates (optionally together with monohydric primary alcohols) to produce polyurethane dispersions. In that case, however, it should be noted that only dispersing agents which contain exclusively secondary hydroxyl groups may be used and they should preferably have a molecular weight of more than about 500 in order to ensure selective reaction of the polyisocyanate with the primary hydroxyl compounds used as component 2.

The quantity of water which should be present during the polyaddition reaction is of decision importance in determining the particle size, the particle size distribution and the final viscosity of the dispersion. Several factors must be taken into account simultaneously: the viscosity and hydrophilic or hydrophobic character of the dispersing agent containing alcoholic groups, the solubility or emulsifiability of the starting components used for the isocyanate polyaddition reaction, the solids content of the resulting dispersion and the temperatures employed. The sequence and method of addition may also be of some influence. With increasing water content, a significant increase in viscosity occurs, particularly if a somewhat hydrophilic higher molecular weight dispersing agent is used. This effect becomes more pronounced with progressive polyaddition reaction.

The maximum quantity of water which may be added is therefore limited. In all cases it is necessary to ensure that the reaction mixture is vigorously mixed in the presence of water during the polyaddition reaction and during the subsequent removal of water by distillation. The quantity of water added would generally be less than 35% by weight but at least about 7% by weight, based on the total quantity of reaction mixture (the higher the desired solid content of the dispersion, the more water should be added). The optimum quantity of water is that which results in the lowest possible final viscosity of the dispersion but which does not require the removal of unnecessarily large quantities of water by distillation. The preferred quantity of water is in many cases between 10 and 25% by weight, based on the reaction mixture. Smaller quantities of water, upwards of about 4% by weight, may be used if the alcohols are strongly hydrophilic.

For obtaining a very low final viscosity, it is also advantageous to employ a very high reaction temperature from the start of the polyaddition reaction, preferably a temperature close to the boiling point of water.

When using stirrer vessels with reflux condensers, the heat produced in the strongly exothermic isocyanate reaction can easily be removed by boiling under reflux. At the same time, any adducts formed in the gaseous phase above the liquid reaction mixture can be continuously washed into the liquid phase by the water while still in statu nascendi and finely dispersed therein.

Various methods may be employed for mixing the dispersing agent with the reactants. In the simplest case, the hydroxyl containing dispersing agent, the necessary quantity of aqueous polymer latex or aqueous polyurethane solution and the amino compound, or primary hydroxyl compound, are introduced into a stirrer vessel and heated with stirring, for example to 70°–90° C. The isocyanate component is then added rapidly so that the reaction mixture boils vigorously under reflux. When producing dispersions with a high solids content, it is advantageous to introduce the polyisocyanate or polyisocyanate mixture into the lower third of the liquid in the reaction vessel. If suitable stirrer apparatus are employed, the reaction temperature may be raised to 105° to 115° C. by employing a slight excess pressure. When the isocyanate groups have undergone complete reaction, the water and any inert solvent present are distilled off at reduced pressure and the dispersion is discharged through a sieve. In many cases, the amine compound optionally dissolved in water and the polyisocyanate may, of course, be introduced simultaneously into the mixture of dispersing agent and aqueous latex. In that case, however, any excess of isocyanate should be avoided. Part of the heat of reaction may be used up, for example, by mixing the polyisocyanates with part of the alcohol used as dispersing agent at room temperature immediately before it is added to the reaction mixture. If the process according to the invention is desired to be carried out continuously, for example, in the case of a large scale commercial production of more than 1000 tons/mo., the dispersing agent, the various reactants and water may be continuously fed into continuous flow mixers. In view of the strongly exothermic nature of the reaction, which increases with increasing solid content, and hence the increasing vapor pressure, the residence time in the reactor must be so short that the reaction temperature in the premixer as far as possible does not exceed 100° C. When preparing a 40% dispersion, for example, the time required for the flow through the mixer should not be substantially above 1 to 3 seconds. The premixed reactants are then introduced into a final stirrer vessel in which they stay for 20 to 30 minutes before being forced into another vessel for removal of the water by distillation.

Distillation of the water may also be carried out at a later stage, but the resulting dispersions then have a higher viscosity.

For obtaining very low viscosities, it is preferred practice to use the discontinuous process followed by immediate removal of water by distillation. This affords great simplicity, reliability in reaction control and reproducibility.

The quantity of water required for subsequent reactions, such as preparation of polyurethane foams, may of course be left in the finished dispersion.

The concentration of polyaddition products in the dispersing agent containing hydroxyl groups may vary within a wide range but is generally between about 1 and about 60% by weight and particularly between 5 and 50% by weight. The dispersions have viscosities of up to 80,000 cP and preferably up to 40,000 cP at 25° C., depending on their concentration. After dilution to a solids content of 10% by weight, they generally have a viscosity below 2500 and preferably below 1500 cP at 25° C. It is a special advantage of the process that in many cases dispersions prepared at very high concentrations have a relatively lower viscosity after dilution with the same dispersing agent then comparable products prepared from the start with low solids contents.

Dispersions with a surprisingly high solids content (up to 50% or more) can be prepared economically in stirrer vessels with reflux condensers in spite of the strongly exothermic reaction of isocyanate groups with amino groups. Since dispersions with a solids content of about 10% by weight are generally used for producing polyurethane resins, it is possible to mix the concentrated dispersions with large proportions by weight of those hydroxyl containing alcohols, e.g. polyesters, which might partially react with water or amino compounds, e.g. by hydrolysis or aminolysis at the temperatures at which preparation of the dispersion is carried out. Thus, for example, a 20% (10%) dispersion in which the proportion by weight of polyether to polyester is 3:5 (1:5) and which has a viscosity only slightly higher than that of the pure polyester or even lower can be obtained from a 40% polyhydrazodicarbonamide dispersion in polyether by stirring an equal quantity or three times the quantity of polyester into it (see Example 7).

It is surprisingly found that these dispersions in polyol mixtures are stable even if under otherwise identical conditions, the polyethers and polyesters are not miscible with each other. The polyurethane solids content dispersed in the product evidently acts as emulsifier, preventing separation of the system into two phases even during prolonged storage. This is another important advantage of the process since it makes it possible for novel polyurethane resin products not obtainable by any other method to be produced from such stabilized polyester/polyether systems.

The use of higher molecular weight hydroxyl polyethers as dispersing agents in the process makes possible as already mentioned above, a highly economic and variable method of commercial production. The process is carried out under mild conditions to produce dispersions having a high solids concentration which may, if desired, be used as master batches. The use of polyethers has, however, yet another important advantage: The large scale commercial production of polyethers leads in most cases to the formation of intermediate stages of aqueous crude polyethers which have a water content of from 8 to 12% and which contain 0.3 to 1% by weight of alkali metal sulphates in solution and 1 to 3% by weight of toluene in suspension. Such a crude polyether suspension is normally distilled under reduced pressure to reduce the water and toluene to a residue of from 0.4 to 1% by weight. The alkali metal sulphates are thereby precipitated and can be removed by means of sponge filters.

The polyether now free from sulphates and containing 0.5 to 1% by weight of water is substantially freed from its residual water by thin layer evaporation so that the water content of the purified commercial polyether is less than 0.5% by weight. It is not necessary, however, to use a highly purified, practically anhydrous polyether. The preliminary stages of crude polyether are satisfactory for the process. Either the substance obtained before thin layer evaporation or, what is particularly advantageous, the so-called crude polyether suspension (containing about 10% of water alkali metal sulphate and toluene) are suitable. The water, toluene and sulphate are removed by distillation and filtration after termination of the isocyanate polyaddition reaction.

According to another possible variation of the present invention, polyisocyanate polyaddition products dispersed in the polyhydroxyl compounds are subsequently cross-linked with formaldehyde in known manner in the presence of catalytic quantities of acids. It is surprisingly found that crosslinked dispersions of this kind are also finely disperse and stable in storage.

The special importance of the present invention lies in the fact that all the above mentioned improvements and modifications in the properties of polyurethane resins can be obtained using the usual raw materials and conventional, in most cases standardized, formulations.

The dispersions prepared by the above process can be used as "modified" lower or higher molecular weight polyhydroxyl compounds in known manner in reactions with polyisocyanates of the kind mentioned above, if desired together with unmodified polyhydroxyl compounds or polyamines, hydrazines or hydrazides of the kind mentioned above as chain lengthening agents. Blowing agents, catalysts and other additives may also be added to produce polyurethane resins with improved mechanical properties. Examples of the products which may be produced include foams, elastomers, homogeneous and porous coatings, lacquers and thermoplastic polyurethanes. In addition, the products of the process may be used as they are or after conversion to "modified" prepolymers by reaction wth a polyisocyanate excess for producing aqueous polyurethane dispersions by known methods.

Suitable organic blowing agents include e.g. acetone; ethyl acetate; halogenated alkanes such as methylene chloride, chloroform, ethylidene chloride, vinylidene chloride, monofluorotrichloromethane, chlorodifluoromethane and dichlorodifluoromethane; butane, hexane, heptane and diethylether. The action of a blowing agent can also be obtained by the addition of compounds which decompose at temperatures above room temperature to liberate gases such as nitrogen, e.g. azo compounds such as azoisobutyric acid nitrile. Other examples of blowing agents and details concerning the use of blowing agents may be found in Kunststoff Handbuch, Volume VII, published by Vieweg and Hochtlen, Carl-Hanser-Verlag, Munich 1966, e.g. on pages 108 and 109, 453–455 and 507–510.

Catalysts may in many cases be used according to the invention, including known catalysts such as tertiary amines, e.g. triethylamine; tributylamine; N-methylmorpholine; N-ethylmorpholine; N-cocomorpholine; N,N,N',N'-tetramethylethylene diamine; 1,4-diazabicyclo-(2,2,2)-octane; N-methyl-N'-dimethyl-aminoethylpiperazine; N,N-dimethylbenzylamine; bis-(N,N-diethylaminoethyl)adipate; N,N-diethylbenzylamine; pentamethyldiethylenetriamine; N,N-dimethylcyclohexylamine; N,N,N',N'-tetramethyl-1,3-butanediamine; N,N-dimethyl-β-phenylethylamine; 1,2-dimethylimidazole; and 2-methylimidazole. The known Mannich bases obtained from secondary amines such as diemthylamine and aldehydes, preferably formaldehyde, or ketones such as acetone, methyl ethyl ketone, cyclohexanone and phenols such as phenol itself, nonylphenol or bisphenol may also be used as catalysts.

Suitable catalysts in the form of tertiary amines having hydrogen atoms which are reactive with isocyanate groups include e.g. triethanolamine, triisopropanolamine, N-methyldiethanolamine, N-ethyl-diethanolamine, N,N-dimethyl-ethanolamine and their reaction products with alkylene oxides such as propylene oxide and/or ethylene oxide.

Silaamines having carbon-silicon bonds may also be used as catalysts, for example those described in German Pat. No. 1,229,290 and U.S. Pat. No. 3,620,984, e.g. 2,2,4-trimethyl-2-silamorpholine and 1,3-diethylaminomethyl-tetramethyldisiloxane.

Basic nitrogen compounds such as tetralkylammonium hydroxides, alkali metal hydroxides such as sodium hydroxide, alkali metal phenolates such as sodium phenolate and alkali metal alcoholates such as sodium methylate may also be used as catalysts. Hexahydrotriazines are also suitable catalysts.

Organic metal compounds may also be used as catalysts according to the invention, in particular organic tin compounds.

The organic tin compounds used are preferably tin (II) salts of carboxylic acids such as tin (II) acetate, tin (II) octoate, tin(II) ethyl hexoate and tin(II) laurate, and tin(IV) compounds such as dibutyl tin oxide, dibutyl tin dichloride, dibutyl tin diacetate, dibutyl tin dilaurate, dibutyl tin maleate or dioctyl tin diacetate. Any of the above mentioned catalysts may, of course, be used as mixtures.

Other representatives of catalysts which may be used according to the invention and details concerning the action of the catalysts may be found in Kunststoff-Handbuch, Volume VII, published by Vieweg and Hochtlen, Carl-Hanser-Verlag, Munich 1966, e.g. on pages 96 to 102.

The catalysts are generally used in a quantity of between about 0.001 and 10% by weight.

Surface-active additives such as emulsifiers and foam stabilizers may also be used according to the invention. Suitable emulsifiers include e.g. the sodium salts of ricinoleic sulphonates or salts of fatty acids with amines such as oleic acid diethylamine or stearic acid diethanolamine. Alkali metal or ammonium salts of sulphonic acids such as dodecylbenzenesulphonic acid or dinaphthylmethane disulphonic acid or of fatty acids such as ricinoleic acid or of polymeric fatty acids may also be used as surface active additives.

Suitable foam stabilizers are, particularly, the polyether siloxanes, especially those which are water soluble. These compounds generally have a polydimethylsiloxane group attached to a copolymer of ethylene oxide and propylene oxide. Foam stabilizers of this kind have been described for example, in U.S. Pat. Nos. 2,834,748; 2,917,480 and 3,629,308.

Other additives which may be used according to the invention include reaction retarders, e.g. substances which are acid in reaction such as hydrochloric acid or organic acid halides; cell regulators known per se such as paraffins or fatty alcohols or dimethylpolysiloxanes; pigments; dyes; flame retarding agents known per se such as trischloroethylphosphate, tricresyl phosphate and ammonium phosphate and polyphosphate; stabilizers against ageing and weathering; plasticizers, fungistatic and bacteriostatic substances; and fillers such as barium sulphate, kieselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances which may also be used according to the invention and details concerning their use and mode of action may be found in Kunststoff Handbuch, Volume VII, published by Vieweg and Hochtlen, Carl-Hanser-Verlag, Munich 1966, e.g. on pages 103 to 113.

The components used for production of the foams are reacted according to the invention by the known one-shot, prepolymer or semiprepolymer process, in many cases using mechanical devices such as those described in U.S. Pat. No. 2,764,565. Details concerning processing apparatus which may be used according to the invention may be found in Kunststoff-Handbuch, Volume VII, published by Vieweg and Hochtlen, Carl-Hanser-Verlag, Munich 1966, e.g. on pages 121 to 205.

The foaming reaction for producing the foams is often carried out inside molds. The reaction mixture is introduced into a mold made of a metal such as aluminum or a synthetic product such as epoxide resin and is foamed up inside the mold to produce the shaped product. Foaming inside molds may be carried out either to produce articles having a cellular structure on their surface or to produce articles having a compact skin and cellular center. According to the invention, one or other effect can be achieved by either introducing just sufficient reaction mixture into the mold to fill the mold after foaming or introducing a larger quantity of reaction mixture. The latter method is known as "overcharging", a procedure which has been described, for example, in U.S. Pat. Nos. 3,178,490 and 3,182,104.

The process of foaming in molds is frequently carried out using known "external mold release agents" such as silicone oils but so-called "internal mold release agents" may also be used, optionally in admixture with external mold release agents, e.g. as disclosed in German Offenlegungsschriften Nos. 2,121,670 and 2,307,589.

Cold setting foams can also be produced according to the invention as described in British Pat. No. 1,162,517 and German Offenlegungsschrift No. 2,153,086.

Foams may, of course, also be produced by the process of block foaming or by the known laminator process.

One factor which is of major importance in determining the improvement in properties of the resulting polyurethane resins, particularly the improvement in compression resistance, is the particle size of the dispersed polyaddition products. For example, when using polyether dispersions as starting material for the production of polyurethane foams, the diameter of the particles of filler must be substantially below the dimensions of the cell walls (20 to 50 μm). In polyurethane coatings, the particles must also be small enough to ensure that even very thin coatings will have a smooth surface and be applied evenly.

The process advantageously gives rise to dispersions having particle sizes of from 0.01 to 5 μm, preferably 0.1 to 1 μm, which satisfy the commercial requirements.

The following Examples serve to explain the process according to the invention. The figures given refer to parts by weight or percentages by weight unless otherwise indicated. This application is a basic improvement over copending applications Ser. Nos. 740,451 and 740,452. The experiments directly related to the presently claimed material are Examples 29-34.

EXAMPLE 1

20% Polyhydrazodicarbonamide dispersion in trifunctional polyether:

$$\text{Index}\left(\frac{NCO}{NH} \cdot 100\right) = 100$$

Reaction Mixture 80.0 parts by weight of a polyether of propylene oxide and ethylene oxide started on trimethylolpropane and having a hydroxyl number of 34 and containing about 80% of primary hydroxyl groups (hereinafter referred to as "polyether I") as dispersing agent;

16.9 parts by weight of tolylene diisocyanate (isomeric mixture of 2,4-: 2,6=80:20; hereinafter referred to as "T 80");

3.1 parts by weight of hydrazine (as 99% hydrate, optionally diluted with water before it is added to the reaction mixture).

Water content: see Table 1.

General Method

The dispersing agent preheated to 70° C. and the hydrazine hydrate diluted with water are mixed in a stirrer vessel equipped with reflux condenser and heated to 80° C. with stirring. The diisocyanate mixture is then rapidly introduced into the stirrer cone. Polyaddition sets in at once with vigorous boiling of the water under reflux. After addition of the diisocyanate, the temperature is lowered to 60°-80° C. within 20 to 30 minutes, if necessary with cooling, and the water is distilled off at reduced pressure. The temperature is allowed to rise to 90°-120° C. towards the end of the reaction until no more water distills over. The reaction mixture is then filtered through a 100 μm sieve when the viscosity allows it (Examples 1b and 1c).

TABLE 1

| | % by weight of water based on | | | | Viscosity | |
| Example | Reaction mixture (including water) | Dispersing agent | Solids content | Dispersion (anhydrous) | 25° C. (cP) 20% | Appearance |
| --- | --- | --- | --- | --- | --- | --- |
| 1a | 4.8 | 6.3 | 25.2 | 5.0 | 268.000 | Paste |
| 1b | 7.9 | 10.7 | 42.7 | 8.5 | 2.700 | Finely divided dispersion |
| 1c | 11.3 | 16.0 | 64.0 | 12.8 | 2.315 1.350 +) | Finely divided dispersion |

+) Diluted to a solids content of 10% by the addition of polyether I

COMPARISON EXAMPLE 1d

When Example 1 is repeated without the addition of water but under otherwise identical conditions, the reaction mixture becomes pasty even during the addition of diisocyanate.

COMPARISON EXAMPLE 1e

When Example 1 is repeated with 50% by weight of water in the reaction mixture, phase separation takes place. The reaction mixture becomes pasty on removal of water.

EXAMPLE 2

40% polyhydrazodicarbonamide dispersion in trifunctional polyether.

The formulation of the reaction mixture is similar to that in Example 1 but adjusted to a solids content of 40%.

At a water content of 20% by weight, based on the reaction mixture including water (this amounts to 41.5% by weight or 62% by weight or 25% by weight, based on dispersing agent or on solids content or on anhydrous dispersion), a very finely divided dispersion (0.3 to 2 μm) is obtained, which has a viscosity of 12,800 cP/25° C. when the residual water content is 0.4% (when diluted with additional polyether I to a solids content of 20% or 10%, the viscosity is 1550 or 1050 cP/25° C.).

Reaction Conditions

The method of Example 1 is modified in that the process is carried out in a 500 l stirrer vessel and the diisocyanate mixture is introduced at slight pressure not into the stirrer cone but into the lower third of the vessel.

COMPARISON EXPERIMENT

Without the addition of water, the reaction mixture becomes pasty and the stirrer is brought to a standstill even before the total quantity of diisocyanate has been added.

EXAMPLE 3

20% Modified polyhydrazodicarbonamide dispersion in trifunctional polyether; Index = 100

Formulation of reaction mixture:
80.0 Parts by weight of polyether I;
1.43 parts by weight of diisocyanate T 80;
3.2 parts by weight of diol urea ether of the formula HO—CH$_2$—CH$_2$—N—CH$_2$—CH$_2$—OH
　　　　　　　　|
　　　　　　　CO—NH—(CH$_2$)$_6$—NHCO—O—(CH$_2$—CH$_2$—O)$_{45}$—C$_4$H$_9$ 3.5 parts by weight of hydrazine (in the form of 99% hydrazine hydrate; added after dilution with water) and a total of
11.9% by weight of water, based on the reaction mixture (=16.8% based on dispersing agent; 67.4% based on solids content; 13.5% based on anhydrous end product).

The method is similar to that of Example 1 but the diol urea ether is previously reacted with an excess of diisocyanate (index 200) at 100° C. and the remaining quantity of diisocyanate T 80 is added to it after cooling and the resulting mixture is introduced into the receiver.

The resulting very finely divided polyol dispersion has a viscosity of 2120 cP/25° C. at a residual water content of 0.5 by weight.

EXAMPLE 3a

Index = 100
Formulation of reaction mixture:
80.0 Parts by weight of a polyether (polyether II) of propylene oxide and ethylene oxide (hydroxyl number = 35; about 70% of primary hydroxyl groups) which has been started on trimethylolpropane:
14.3 parts by weight of diisocyanate T 80;
4.4 parts by weight of diethylene glycol;
1.3 parts by weight of hydrazine (as 99% hydrate; introduced into the receiver as a dilution with water); and a total of
(13.7% by weight of water, based on the reaction mixture including water (=19.8% based on dispersing agent; 73.4% based on solids content; 15.9% based on anhydrous end product).

The method is similar to that of Example 1 but a prepolymer is first prepared from diethylene glycol and part of the diisocyanate (index 200) and the remaining diisocyanate is then added to the prepolymer before it is introduced into the reaction mixture.

The viscosity of the resulting finely divided, substantially anhydrous 20% dispersion is 2670 cP/25° C.

EXAMPLE 4

A 38.3% dispersion in a linear polyether of an OH functional polyhydrazodicarbonamide polyurea.

$$\text{Index 1}\left(\frac{NCO}{NH}\cdot 100\right) = 100$$

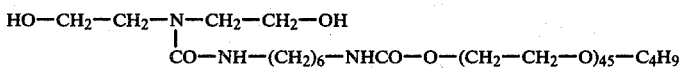

$$\text{Index 2}\left(\frac{NCO}{NH + OH}\cdot 100\right) = 91$$

Formulation of reaction mixture:
61.7 parts by weight of a linear polypropylene glycol having secondary hydroxyl groups (hereinafter referred to as polyether III; OH number = 56);
31.0 parts by weight of diisocyanate T 80;
5.2 parts by weight of hydrazine (as 99% hydrazine hydrate; added as a dilution with water);
2.1 parts by weight of ethanolamine; a total of
22.3% by weight of water, based on the reaction mixture including water (=46.5% based on dispersing agent: 75.1% based on solids content; 28.7% based on anhydrous dispersion).

The method is similar to that of Example 2.

The resulting stable polyether dispersion which has a residual water content of 0.2% by weight and a concentration of 40% has a viscosity of 2460 cP at 25° C. or when diluted to 20% with the polyether used it has a viscosity of 680 cp/25° C. or when diluted to 10% with the polyether used the viscosity is 510 cP/25° C.

EXAMPLE 4a

The formulation given in Example 4 is modified in a similar manner to Example 3, but using as prepolymer the reaction product of the diisocyanate with 3% by weight of the dispersing agent (based on the total solids content). The dispersion obtained is even more finely divided than that of Example 4 and it has excellent flow properties.

EXAMPLE 5

A 40%, highly cross-linked polyurea-polyhydrazodicarbonamide dispersion in trifunctional polyether;

Index = 100.
Formulation of reaction mixture:
60.0 parts by weight of polyether I;
31.0 parts by weight of diisocyanate T 80;
2.9 parts by weight of hydrazine (added as hydrazine hydrate diluted with water);
6.1 parts by weight of diethylene triamine; a total of
18.9% by weight of water, based on the reaction mixture including water (=38.9% based on dispersing agent; 58.4% based on solids content; 23.3% based on anhydrous end product).

The stable dispersion prepared in a similar manner to Example 1 has a viscosity of 18,500 (3,800 or 2,200) cP/25° C. at 40% (20% or 10%).

EXAMPLE 6

20% Polyhydrazodicarbonamide dispersion in polyester;

Index = 100.
Formulation of reaction mixture:
80 parts by weight of a polyester of adipic acid, trimethylol propane and diethylene glycol (hydroxyl number=56; acid number=1; hereinafter referred to as polyester ATD);
16.9 parts by weight of diisocyanate T 80;
3.1 parts by weight of hydrazine (added as hydrazine hydrate diluted with water); a total of
11.3% by weight of water, based on the reaction mixture including water (=16% based on dispersing agent; 64% based on solids content; 12.8% based on anhydrous polyester dispersion).

The method is similar to that of Example 1. A stable dispersion is obtained. Its viscosity at a solids content of 20% is 35,500 cp/25° C. and at 10% the viscosity is 24,500 cP/25° C. The pure polyester has a viscosity of 21,400 cP/25° C.

COMPARISON EXPERIMENT

If no water is introduced into the receiver before the diisocyanate is added to that only the small quantity of water from the undiluted hydrazine hydrate is present, the reaction mixture completely solidifies even before all the diisocyanate has been added.

EXAMPLE 7

Dispersion in a polyether/polyester mixture.

If the solids content of the 38.3% dispersion from Example 4 is reduced to 20% by weight or 10% by weight, respectively, by stirring polyester ATD (viscosity 21,400 cP/25° C.) into the dispersion, a stable polyether/polyester mixture having a viscosity of 19,800 or 24,200 cP/25° C. is obtained.

A mixture of pure polyether III and polyester ATD (without any solid dispersed in it), on the other hand, separates into two phases after only a few hours.

EXAMPLE 8

20% polyurethane dispersion in polyether containing secondary OH groups; Index=100

Formulation of reaction mixture:
80.0 parts by weight of polyether III;
11.8 parts by weight of diisocyanate T 80;
8.2 parts by weight of N-methyl diethanolamine;
7% by weight of water, based on the reaction mixture including water (=9.4% based on dispersing agent: 37.5% based on solids content; 7.5% based on anhydrous dispersion).

Method

Polyether, N-methyldiethanolamine and water are introduced into the stirrer apparatus at room temperature and the diisocyanate is added slowly with cooling so that the reaction temperature does not rise above 50° C. One hour after all the isocyanate has been added, the water is distilled off at reduced pressure. The temperature may gradually be raised to 90° C. towards the end of distillation.

The viscosity of the resulting stable 20% dispersion is 2.210 cP/25° C.

COMPARISON EXPERIMENT

When the process is carried out without the addition of water to the reaction mixture but under otherwise identical reaction conditions, the dispersion obtained sediments overnight.

EXAMPLE 9

20% polyhydrazodicarbonamide dispersion in trifunctional polyether

Formulation of reaction mixture:
80.0 parts by weight of a polyether of propylene oxide and ethylene oxide (Hydroxyl number 28; approximately 80% of primary (hydroxyl groups) which has been started on trimethylolpropane;
7.1 parts by weight of tolylene diisocyanate; (isomeric mixture 2,4:2,6=65:35);
10.2 parts by weight of 4,4'-diphenylmethane diisocyanate;
2.7 parts by weight of hydrazine (as 99% hydrate; introduced after dilution with water); a total of
13.0% by weight of water, based on the reaction mixture including water (=18.6% based on dispersing agent; 74.5% based on solids content; 14.9% based on anhydrous end product).

Method

The polyether is used in the form of a crude polyether suspension containing 10.5% of water and 0.5% of alkali metal sulphate and mixed with the hydrazine hydrate. Polyaddition takes place in situ as a result of the addition of a mixture of the above mentioned diisocyanates under the conditions specified in Example 1.

The resulting 20% dispersion which is stable and substantially anhydrous has a viscosity of 4200 cp/25° C. After dilution to 10% with a further quantity of (anhydrous) polyether, it has a viscosity of 2100 cP/25° C.

EXAMPLE 10

The method is completely similar to that of Example 9 but pure diphenylmethane diisocyanate is replaced by a crude MDI. The viscosity of the 20% and 10% stable dispersions, respectively, is 3200 and 1900 cP/25° C.

EXAMPLE 11

100 Parts by weight of the polyhydrazodicarbonamide-polyether dispersion according to Example 1c adjusted to a solids content of 20%.

3.0 parts by weight of water,
0.2 parts by weight of triethylene diamine,
0.3 parts by weight of 2-dimethylamino-ethanol,
0.8 parts by weight of commercial polysiloxane foam stabilizer (OS 15 of Bayer AG) and
0.22 parts by weight of tin-(II)-octoate were mixed together. This mixture was vigorously stirred at room temperature with 24.1 parts by weight of tolylene diisocyanate (65% 2,4- and 35% 2,6-isomer) and
12.0 parts by weight of tolylene diisocyanate (80% 2,4-and 20% 2,6-isomer).

A creamy reacton mixture formed after 8 to 9 seconds. Its rise time was 75 seconds and its gel time 120 seconds.

The resulting foam was found to have the following mechanical properties:

| | |
|---|---|
| Gross density according to DIN 53 420 | 33 kg/m$^3$ |
| Tensile strength according to DIN 53 571 | 160 KPa |
| Elongation at break according to DIN 53 571 | 190% |
| Compression resistance according to DIN 53 577 | 5.3 KPa |
| Indentation hardness according to ASTM D 1564-71T: | |
| H-value at 25% deformation (N) | 290 |
| H-value at 65% deformation (N) | 540 |
| RH-value at 25% deformation (N) | 200 |
| (25% RH-value/25% H-value) × 100 | 70% |
| 65% H-value/25% H-value | 1.9 |

COMPARISON EXPERIMENT

The same formulation was used except that the polyhydrazodicarbonamide dispersion was replaced by 100 parts by weight of polyether I used as dispersing agent. Observing the same ratio of NCO/OH groups (index), a foam of the same gross density is obtained but its compression resistance according to DIN 53 577 is only 4.8 kPa.

EXAMPLE 12

100 parts by weight of the dispersion from Example 1c,
5.0 parts by weight of water,
0.2 parts by weight of triethylene diamine,
0.3 parts by weight of 2-dimethylamino-ethanol,
1.0 parts by weight of polysiloxane foam stabilizer (OS 15 of Bayer AG) and
0.2 parts by weight of tin-(II)-octoate were mixed together. The resulting mixture was then stirred together with 28.55 parts by weight of tolylene diisocyanate (65% 2,4- and 35% 2,6-isomer) and
28.55 parts by weight of tolylene diisocyanate (80% 2,4- and 20% 2,6-isomer)

at room temperature. A creamy reaction mixture having a rise time of 55 seconds and a gel time of 100 seconds was obtained after 6–7 seconds.

The resulting foam was found to have the following mechanical properties:

| | |
|---|---|
| Gross density according to DIN 53 420 | 24 kg/m$^3$ |
| Tensile strength according to DIN 53 571 | 140 KPa |
| Elongation at break according to DIN 53 571 | 180% |
| Compression resistance according to DIN 53 577 | 4.1 KPa |
| Indentation hardness according to ASTM D 1564-71T: | |
| H-value at 25% deformation | 130 |
| H-value at 65% deformation | 255 |
| RH-value at 25% deformation | 95 |
| (25% RH-value/25% H-value) × 100 | 73% |
| 65% H-value/25% H-value | 2.0 |

EXAMPLE 13

100 parts by weight of the dispersion from Example 1c adjusted to a solids content of 10%,
3.0 parts by weight of water,
0.1 part by weight of triethylene diamine,
0.3 part by weight of 2-dimethylamino-ethanol,
1.0 part by weight of polysiloxane foam stabilizer (OS 15 of Bayer AG) and
0.18 parts by weight of tin-(II)-octoate were mixed together. The resulting mixture was vigorously stirred together with 19.2 parts by weight of tolylene diisocyanate (65% 2,4- and 35% 2,6-isomer) and
19.2 parts by weight of tolylene diisocyanate (80% 2,4- and 20% 2,6-isomer)

at room temperature. A creamy reaction mixture having a rise time of 102 seconds and a gel time of 180 seconds was obtained after 10 seconds.

The resulting foam was found to have the following mechanical properties:

| | |
|---|---|
| Gross density according to DIN 53 420 | 34 kg/m$^3$ |
| Tensile strength according to DIN 53 571 | 150 KPa |
| Elongation at break according to DIN 53 571 | 200% |
| Compression resistance according to DIN 53 577 | 5.1 KPa |
| Indentation hardness according to ASTM D 1564-71T: | |
| H-value at 25% deformation | 275 |
| H-value at 65% deformation | 510 |
| RH-value at 25% deformation | 180 |
| (25% RH-value/25% H-value) × 100 | 65 |
| 65% H-value/25% H-value | 1.9 |

EXAMPLE 14

100 parts by weight of the dispersion from Example 1c,
5.0 parts by weight of water,
0.1 part by weight of triethylene diamine,
0.3 part by weight of 2-dimethylamino-ethanol,
1.2 parts by weight of polysiloxane foam stabilizer (OS 15 of Bayer AG) and
0.2 parts by weight of tin-(II) octoate were mixed together. The resulting mixture was vigorously stirred together with 28.85 parts by weight of tolylene diisocyanate (65% 2,4- and 35% 2,6-isomers) and
28.85 parts by weight of tolylene diisocyanate (80% 2,4- and 20% 2,6-isomer)

at room temperature. A creamy reaction mixture having a rise time of 60 seconds and a gel time of 100 seconds was obtained after 8 seconds.

The resulting foam was found to have the following mechanical properties:

| | |
|---|---|
| Gross density according to DIN 53 420 | 23 kg/m³ |
| Tensile strength according to DIN 53 571 | 140 KPa |
| Elongation at break according to DIN 53 571 | 190% |
| Compression resistance according to DIN 53 577 | 3.9 KPa |
| Indentation hardness according to ASTM D 1564-71T: | |
| H-value at 25% deformation | 110 |
| H-value at 65% deformation | 235 |
| RH-value at 25% deformation | 80 |
| (25% RH-value/25% H-value) × 100 | 72 |
| 65% H-value/25% H-value | 1.9 |

EXAMPLE 15

100 parts by weight of the stable polyurea-polyhydrazodicarbonamide dispersion (polyester:polyether=5:1) from Example 7 adjusted to a solids content of 10%,
4.0 parts by weight of water,
0.6 parts by weight of dimethylbenzylamine,
0.1 parts by weight of Sn-(II)-octoate and
2.0 parts by weight of a commercial polysiloxane foam stabilizer (OS 25 of Bayer AG)

were mixed together. The resulting mixture was intimately stirred together with 52.5 parts by weight of diisocyanate T 80 at room temperature. A creamy reaction mixture having a rise time of 65 seconds and a gel time of 125 seconds was obtained after 10 seconds.

The resulting foam has open cells in contrast to pure polyester foams, which generally have closed cells, and on account of its uniform, very fine cell structure it is suitable, for example, as filter material.

When the example is repeated with a mixture of pure polyester and polyether mixed in the same proportions without polyurethane solids dispersed therein, an open celled foam is again obtained but its cells are substantially larger with the cell membranes still partly present.

The mixture of pure polyester and polyether is moreover not stable in storage, as already mentioned earlier. When left to stand at room temperature, it separates into two phases within a short time.

EXAMPLE 16

Homogeneous Polyurethane Sheets (a) Preparation of a Prepolymer 89.7 parts by weight of the 40% polyether dispersion from Example 2 are reacted with 10.3 parts by weight of diisocyanate T 80 at 100°–110° C. until the free isocyanate content is 3.0% by weight.

The resulting prepolymer has a viscosity of 24,800 cP/25° C. and is stable in storage at room temperature.

(b) Preparation of a Polyurethane Elastomer

The prepolymer is mixed with 0.2% by weight of tin-(II) octoate and spread out on a glass plate to form a layer 500 μm in thickness, using a doctor knife. The product obtained after heat treatment at 110°–130° C. (30–60 minutes) is a film which has good mechanical properties and is resistant to organic solvents.

(c) Solvent-free Coating

When the same prepolymer is mixed with less than the equivalent quantity of ethanolamine by 5 equivalent % in a small capacity continuous flow high speed stirrer and the mixture is applied to a separating paper to form a layer 500 μm in thickness by the reversal process, using a doctor knife, the elastomer formed in this process solidifies within a few seconds in an infra-red channel. While the layer is still tacky, a textile substrate is placed on it under light pressure and the polyaddition reaction is completed in a heating channel with the temperature falling from 180° C. to 120° C.

The coated fabric obtained in this way is highly resistant to abrasion and organic solvents.

COMPARISON EXPERIMENTS

When a prepolymer containing 3% of free isocyanate groups is prepared from the pure dispersing agent (polyether I) by a similar method to Example 16 and heated with the catalyst under otherwise identical conditions and cooled to room temperature, one merely obtains a transparent, sticky elastomer mass which has no structural stability and cannot be stripped from its substrate.

The addition of ethanolamine results in a similar sticky product.

EXAMPLE 17

10% dispersion of aromatic BHS (bisurea) in trifunctional polyether.

Formulation 936 parts by weight of polyether I;
68 parts by weight of a 25% aqueous ammonia solution;
87 parts by weight of T 80.

Water Content 4.7% by weight, based on the reaction mixture including water.

Method and Reaction Conditions

The dispersing agent and aqueous ammonia solution are introduced at room temperature (18° to 25° C.) into a vessel equipped with stirrer and reflux condenser. Diisocyanate T 80 is added directly to the liquid phase of the mixture, with stirring, so that the temperature rises to 50°–70° C. as a result of the exothermic polyaddition reaction. Distillation of water at reduced pressure can be begun as soon as the addition of isocyanate has been completed. The hot, anhydrous dispersion is discharged through a 100μ sieve.

The dispersion has a viscosity of 2560 cP at 25° C.

EXAMPLE 17a

Example 17 is repeated under the same conditions and using the same starting components but with a water content of 10% by weight in the reaction mixture and using the quantity of polyether I required to produce a 20% dispersion. The resulting anhydrous 20% dispersion has a viscosity of 7430 cP at 25° C. immediately after it has been prepared. If left to stand for some time at room temperature, its viscosity generally rises to a considerable extent but can be reduced to its original value by 5 minutes' stirring at room temperature. After dilution to a solid content of 10% with additional polyether I, the dispersion has a viscosity of 2050 cP at 25°

C. The viscosity of this 10% dispersion remains constant even during prolonged storage.

EXAMPLE 18

10% aromatic bis-urea dispersion in trifunctional polyether.

Formulation 1917 parts by weight of polyether I;
102 parts by weight of 25% aqueous ammonia solution;
187.5 parts by weight of 4,4'-diisocyanatodiphenylmethane (hereinafter referred to as "D 44");

Water Content 3.5 percent by weight.

Reaction Conditions

Diisocyanate D 44 heated to a temperature of from 90° to 110° C. is introduced into the mixture of dispersing agent and ammonia solution as described in Example 17 and the water is then distilled off.

The viscosity of the 10% dispersion is 25° C. at 3610 cP.

EXAMPLE 19

20% aromatic bis-urea dispersion in a linear polyether.

Formulation 416 parts by weight of a linear propylene glycol (hydroxyl number 56) as dispersing agent;
68 parts by weight of 25% aqueous ammonia solution;
87 parts by weight of diisocyanate T 80;

Water Content 8.9 percent by weight.

The method is the same as in Example 17. The 20% dispersion has a viscosity of 1930 cP at 25° C. This viscosity does not change even during prolonged storage.

EXAMPLE 20

20% aromatic bis-urea dispersion in a linear polyether.

Formulation 1136 parts by weight of the polyether described in Example 19,
136 parts by weight of 25% aqueous ammonia solution;
56 parts by weight of water;
250 parts by weight of diisocyanate D 44.

Water Content

10% by weight.

The reaction conditions are the same as indicated in Example 18. The finely divided 20% dispersion has a viscosity of 1960 cP at 25° C.

EXAMPLE 20a 20.9% PMU (polymethyleneurea) dispersion in linear polyether.

If the bis-urea dispersion from Example 20 is left to react for one hour at 70° to 95° C. with the quantity of aqueous formalin solution required to provide one formaldehyde molecule for every two urea groups in the presence of a catalytic quantity of 85% phosphoric acid, optionally before the water is distilled off, a polymethylene urea dispersion is obtained which, when anhydrous and at a solids content of 20.9% (10%), has a viscosity of 2860 cP (1680 cP) at 25° C.

EXAMPLE 21

20% aliphatic bis-urea dispersion in a linear polyether.

Formulation 808 parts by weight of the polyether described in Example 19;
136 parts by weight of 25% aqueous ammonia solution;
10 parts by weight of water;
168 parts by weight of hexamethylene-1,6-diisocyanate.

Water Content 10 percent by weight.

Preparation of the dispersion is carried out by the method described in Example 17.

At 25° C. the anhydrous 20% (15%, 10%) dispersion has a viscosity of 9800 cP (1750 cp, 1040 cP).

EXAMPLE 22

20% aromatic bis-urea dispersion in monoethylene glycol.

Formulation 416 parts by weight of monoethylene glycol,
68 parts by weight of 25% aqueous ammonia solution,
87 parts by weight of diisocyanate T 80.

Water Content 8.9 percent by weight.

Preparation of the dispersion is carried out as described in Example 17. As can be seen from the following table, the viscosity of the aqueous dispersion varies considerably both with solids content and with temperature.

| Solids Content (% by weight) | Temperature (°C.) | Viscosity (cP) |
|---|---|---|
| 20 | 25 | highly viscous paste |
| 20 | 50 | 270 |
| 17.5 | 50 | 150 |
| 17.5 | 40 | 175 |

EXAMPLE 23

20% aromatic bis-urea dispersion in monoethylene glycol.

Example 20 is repeated but using 1136 parts by weight of monoethylene glycol instead of the polyether described in Example 19.

Viscosity of the finely divided stable dispersion at 25° C. (depending on the solids content):

| Solids content (% by weight) | 20 | 17.5 | 15 | 10 |
|---|---|---|---|---|
| Viscosity (cp) | 1200 | 700 | 200 | 71 |

EXAMPLE 24

Continuous method of carrying out the process of Example 1.

The reactants are continuously fed into a reaction vessel from two storage vessels B 1 and B 2. Vessel B 1 contains a mixture of 10,000 parts by weight of polyether I, 612 parts by weight of hydrazine hydrate and 1380 parts by weight of water and vessel B 2 contains 2113 parts by weight of diisocyanate T 80.

The rate of feed is 119.90 g per minute from B 1 and 21.13 g per minute from B 2. The combined rate of feed is therefore 141.03 g per minute.

Method

Using a twin piston pump, the mixture which is heated to 95° C. in B 1 and the diisocyanate from B 2, which is kept at 20° C., are combined coaxially in a static mixer (manufactured by Kenics; diameter ¼ inch; 21 elements; volume approximately 3 ml) (residence time in mixer about 1.3 seconds) and the mixture is delivered at a preliminary pressure of 2 to 3 bar into a steel reaction tube about 6 m in length. The diameter of this tube is about 9 mm and the temperature inside the tube is kept to 130°±5° C. by heating or cooling.

The reaction tube ends in a separating vessel in which the practically anhydrous dispersion is restirred at a pressure of 20 Torr and a temperature of 70° C. during an average residence time of about 4 to 8 minutes. The separating vessel is connected to a distillation bridge and, via a pump, to another vessel used as receiver for the end product.

The resulting, finely divided, 20% dispersion has a viscosity of 2460 cP at 25° C.

EXAMPLE 24a (COMPARISON EXPERIMENT)

When Example 24 is repeated without using water, the reaction mixture already solidifies inside the static mixer so that delivery into the multiphase flow tube is practically impossible.

EXAMPLE 25

20% polyhydrazodicarbonamide dispersion in castor oil.

Formulation 80.0 parts by weight of castor oil;
16.9 parts by weight of diisocyanate T 80;
3.1 parts by weight of hydrazine (in the form of an aqueous solution of hydrazine hydrate); a total of
11.3 parts by weight of water.

The method is the same as that described in Example 1. The viscosity of the 20% dispersion at 25° C. is 5950 cP.

EXAMPLE 25a (COMPARISON EXPERIMENT)

When Example 25 is repeated with a total water content in the formulation of only 1.8% by weight, based on the total mixture, the reaction product becomes pasty during removal of the water by distillation, and finally becomes rubbery.

EXAMPLE 26

Modification of a dispersion according to Example 1c with formaldehyde

A 37% aqueous formaldehyde solution (10% by weight of formaldehyde, based on the solids content of the dispersion) and a catalytic quantity of 85% phosphoric acid are added to the 20% polyhydrazodicarbonamide dispersion from Example 1c, optionally before the water is distilled off, and the mixture is gradually heated to 80°–90° C. The water is finally distilled off at reduced pressure.

The dispersion, which is substantially free from formaldehyde, is practically unchanged in its low viscosity at 25° C. and can be used for producing polyurethane foams which have improved compression resistance.

EXAMPLE 27

The procedure is the same as described in Example 26 but 10% by weight of an aqueous solution of dimethylolurea, based on the solids content, is used instead of an aqueous formaldehyde solution for subsequent modification of the polyhydrazodicarbonamide dispersion.

The modification increases the viscosity of the polyhydrazodicarbonamides dispersion by only about 5%.

EXAMPLE 28

20% hydrazodicarbonamide-bis-urea dispersion in polyether III.

Formulation 80.0 parts by weight of polyether III;
1.1 parts by weight of hydrazine (used as hydrazine hydrate diluted with water);
1.2 parts by weight of ammonia (added as 25% aqueous solution); a total of
11.2 parts by weight of water;
17.7 parts by weight of 4,4'-diisocyanatodiphenylmethane.

Method

The dispersing agent and the aminofunctional compounds dissolved in water are introduced at room temperature into a stirrer apparatus equipped with reflux condenser, and the diisocyanate, which has been heated to about 100° C., is directly introduced into the liquid phase of the mixture with vigorous stirring. The reaction temperature rises to about 65°–75° C. Water is then removed at reduced pressure. The resulting finely divided, 20% dispersion has a viscosity of 1920 cP at 25° C.

The dispersion can easily be modified by aftertreatment with formaldehyde in a similar manner to Example 26 to yield a dispersion with only slightly increased viscosity and containing polymethylene urea groups.

USE OF A POLYMER LATEX

EXAMPLE 29

20% dispersion of PHD/SAN (polyhydrazodicarbonamide/styrene-acrylonitrile copolymer) in trifunctional polyether. Ratio of solids contents PHD:SAN=1:1.

Formulation 824.00 parts by weight of Polyether I (See Example 1)
257.50 parts by weight of a commercially available 40% aqueous styreneacrylonitrile dispersion (copolymer of styrene:acrylonitrile=72:28; (R)Perbunan 28 of Bayer AG; hereinafter referred to as "SAN-Latex");
25.25 parts by weight of hydrazine monohydrate (99%);
87.00 parts by weight of T 80
Index=NCO/NH·100=100; water content:13.7% by weight based on reaction mixture (including water).

GENERAL METHOD OF PREPARATION

The polyether, preheated to 60° to 75° C., aqueous polymer latex and hydrazine hydrate are combined in a vessel equipped with stirrer and reflux condenser. Into this mixture, which is at 75° C., the diisocyanate is introduced directly through an inlet tube at a rate such that the temperature is raised to 85° to 95° C. by the exothermic polyaddition reaction. The pressure may then be gradually reduced so that the water derived from the polymer latex and the water of hydration are distilled off. Towards the end of this distillation, the temperature is raised to 100°-120° C./20-40 Torr. The practically anhydrous dispersion is discharged hot through a 100 μm sieve.

The viscosities at 25° C. (at solid contents of 20% and 10%, respectively) are 4650 and 1780 cP.

EXAMPLE 29a

40% PHD/SAN dispersion in Polyether I.
Ratio of solids contents = 1:1.

The formulation and method are the same as in Example 29 but using only 309 parts by weight of polyether I and a water content of 24.1% by weight.

The finely divided dispersion has a viscosity of 68.500 (3200, 1470) cP at 25° C. when the solids content is 40% (20%; 10%). Particularly in its highly concentrated form, it is suitable for use as "masterbatch" for mixing with polyesters containing hydroxyl groups.

EXAMPLE 30

20% PHD/SAN (polyhydrazodicarbonamide/polybutadiene) dispersion in polyether I.
Ratio of solids contents PHD/SBR = 1:1.

Formulation 824.00 Parts by weight of polyether I as dispersing agent;
229.00 parts by weight of a 45% aqueous polybutadiene latex;
25.25 parts by weight of hydrazine monohydrate (99%);
87.00 parts by weight of diisocyanate "T 80";
Index = 100; water content 11.6% by weight.

The method of procedure is the same as described in Example 29.

The anhydrous 20% (10%) dispersion has a viscosity of 4480 (1880) cP at 25° C.

EXAMPLE 31

20% PHD/ABS (graft copolymer) dispersion in branched polyether.
The ratio of solids contents = 1:1.
824 parts by weight of a polyether of propylene oxide and ethylene oxide started on trimethylolpropane (hydroxyl number of polyether = 31; about 70% primary hydroxyl groups) as dispersing agent;
312.00 parts by weight of a commercially available 33% aqueous dispersion of 70% by weight of styrene-acrylonitrile copolymer and 30% by weight of graft copolymer of polybutadiene, styrene and acrylonitrile ((R)Novodur PH of Bayer AG; hereinafter referred to as "ABS dispersion");
25.25 parts by weight of hydrazine monohydrate (99%);
87.00 parts by weight of tolyene-2,4-diisocyanate (hereinafter referred to as "T 100");
Index = 100; water content: 17.5% by weight.

The method of procedure is the same as described in Example 29. The 20% (10%) anhydrous stable dispersion has a viscosity of 6,900 (1790) cP at 25°.

EXAMPLE 32

20% PHD/PE (polyethylene) dispersion (ratio of solid contents 1:1) in the polyether described in Example 31.

The formulation and method of procedure are the same as in Example 31 except that 257.5 parts by weight of a 40% aqueous PE dispersion ((R)Palatal of BASF AG) are used instead of the ABS dispersion. The water content during the diisocyanate polyaddition is 13.7% by weight.

The 20% (10%) dispersion has a viscosity of 8450 (2160) cP at 25° C.

USE OF A SOLUTION OF AN IONIC POLYURETHANE

EXAMPLE 33

20% dispersion of PHD(OH)$_2$ (polyhydrazodicarbonamide containing hydroxyl groups)/PUR elastomer dispersion in a secondary hydroxyl containing polyether. Ratio of solids contents; 15:5.

Formulation

1267 Parts by weight of a linear polypropylene glycol containing secondary hydroxyl groups, hydroxyl number 56, as dispersing agent;
188.6 parts by weight of a commercially available 40% anionic aqueous PUR dispersion ((R)Impranil DLN of Bayer AG) from a polyester of hexanediol, neopentyl glycol and adipic acid (molecular weight 1800); hexamethylene-1,6-diisocyanate, ethylenediamine; and a diaminosulphonate of the formula $$H_2N-CH_2-CH_2-NH-CH_2-CH_2-SO_3^{\ominus}Na^{\oplus}$$

(Shore hardness A 60);
50.5 parts by weight of hydrazine monohydrate (99%);
13.0 parts by weight of ethanolamine;
192.5 parts by weight of tolylene-2,4-diisocyanate;

$$\text{Index}\left(\frac{NCO}{NH}\right) \cdot 100 = 100; \text{ water content: } 11.8\% \text{ by weight}$$

$$\text{Index}\left(\frac{NCO}{NH + OH}\right) \cdot 100 = 91.$$

Method

Dispersing agent, aqueous PUR dispersion and NH compounds are introduced into the reaction vessel as described in Example 29 and the mixture is heated to 95° C. before introduction of the diisocyanate is begun. Distillation of water at reduced pressure may be started immediately after addition of the diisocyanate.

The anhydrous, stable dispersion has a viscosity of 590 cP at 25° C. and shows a pronounced Tyndall effect.

EXAMPLE 33a

40% PHD(OH)$_2$/PUR dispersion

Example 33 is repeated but using only 475 parts by weight of the polyether and a water content of 13.9% by weight.

The 40% (20%) dispersion has a viscosity of 4310 (575) cP at 25° C.

EXAMPLE 34

20% PHD(OH)$_2$/PUR dispersion in branched polyether.

Ratio of solids contents = 15:5.

1267.0 Parts by weight of a polyethylene glycol started on trimethylolpropane and having a hydroxyl number of 550;

188.6 parts by weight of a cationic 40% aqueous cross-linked PUR dispersion from a polyester of adipic acid, phthalic acid and diethylene glycol (molecular weight of polyester 1700), a mixture of equimolar amounts of tolylene diisocyanate and hexamethylene diisocyanate, N-methyldiethanolamine, diethylene triamine and dimethylsulphate as quaternising agent (Shore A hardness 85);

50.5 parts by weight of hydrazine monohydrate (99%);
13.0 parts by weight of ethanolamine;
192.5 parts by weight of tolylene diisocyanate (mixture of isomers 2,4:2,6=4:1);

$$\text{Index}\left(\frac{NCO}{NH}\right) \cdot 100 = 100; \text{ water content: } 11.8\% \text{ by weight;}$$

$$\text{Index}\left(\frac{NCO}{NH + OH}\right) \cdot 100 = 91.$$

The finely divided 20% dispersion prepared as described in Example 33 has a viscosity of 2100 cP at 25° C.

What is claimed is:

1. In a process for "in situ" preparation of stable dispersions of non-ionic polyisocyanate polyaddition products in compounds with hydroxyl groups as dispersing agents which comprises reacting
   1. organic polyisocyanates with
   2. compounds having primary and/or secondary amino groups and/or primary hydroxyl groups and/or ammonia in
   3. compounds having at least one hydroxyl group, wherein compounds (3) having secondary hydroxyl groups if compounds 2 have primary hydroxyl groups and wherein the components are reacted together in the presence of more than 4% by weight of water, based on the quantity of reaction mixture including water, the water being subsequently removed in known manner if desired the improvement which comprises reacting said components in the presence of a polymer latex or solution of an ionic polyurethane.

2. The process of claim 1, wherein an aqueous polymer latex or the aqueous solution of an ionic polyurethane is added to the hydroxyl containing dispersing agent and the polyisocyanate polyaddition products are thereafter prepared in situ.

3. The process of claim 2, wherein an aqueous polymer dispersion having a solids content of between 5% by weight and 55% by weight is used.

4. The process of claim 1, wherein the dispersion of a vinyl polymer or of a polycondensation product in the hydroxyl containing dispersing agent is first prepared in situ and the polyisocyanate polyaddition reaction thereafter proceeds in the presence of water.

5. The process of claim 1, wherein the polymer dispersed in a non-aqueous organic medium is added to the hydroxyl containing dispersing agent and thereafter the polyisocyanate polyaddition reaction proceeds after the addition of water.

6. In a process for the production of polyurethane resins in which polyisocyanates are reacted with compounds containing active-hydrogen atoms and other known additives and the active hydrogen containing compound is a stable dispersion of polyisocyanate polyaddition products in hydroxyl containing compounds as dispersing agents which are formed by the process which comprises reacting in situ
   1. organic polyisocyanates with
   2. compounds having primary and/or secondary amino groups and/or primary hydroxyl groups and/or ammonia in
   3. compounds having at least one hydroxyl group, wherein compounds (3) having secondary hydroxyl groups if compounds 2 have primary hydroxyl groups and wherein the components are reacted together in the presence of more than 4% by weight of water, based on the quantity of reaction mixture including water, the water being subsequently removed in known manner if desired the improvement which comprises carrying out the polyisocyanate polyaddition reaction in the presence of a polymer latex or solution of an ionic polyurethane.

7. The process of claim 6, wherein an aqueous polymer latex or the aqueous solution of an ionic polyurethane is added to the hydroxyl containing dispersing agent and the polyisocyanate polyaddition products are thereafter prepared in situ.

8. The process of claim 6, wherein an aqueous polymer dispersion having a solids content of between 5% by weight and 55% by weight is used.

9. The process of claim 6, wherein the dispersion of a vinyl polymer or of a polycondensation product in the hydroxyl containing dispersing agent is first prepared in situ and the polyisocyanate polyaddition reaction thereafter proceeds in the presence of water.

10. The process of claim 6, wherein the polymer dispersed in a non-aqueous organic medium is added to the hydroxyl containing dispersing agent and thereafter the polyisocyanate polyaddition reaction proceeds after the addition of water.

* * * * *